(12) United States Patent
Goodrich et al.

(10) Patent No.: US 11,501,499 B2
(45) Date of Patent: Nov. 15, 2022

(54) VIRTUAL SURFACE MODIFICATION

(71) Applicant: Snap Inc., Santa Monica, CA (US)

(72) Inventors: Kyle Goodrich, Venice, CA (US); Samuel Edward Hare, Los Angeles, CA (US); Maxim Maximov Lazarov, Culver City, CA (US); Tony Mathew, Los Angeles, CA (US); Andrew James McPhee, Culver City, CA (US); Wentao Shang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/723,540

(22) Filed: Dec. 20, 2019

(65) Prior Publication Data

US 2020/0202632 A1 Jun. 25, 2020

Related U.S. Application Data

(60) Provisional application No. 62/782,916, filed on Dec. 20, 2018.

(51) Int. Cl.
*G06T 19/00* (2011.01)
*G06T 7/194* (2017.01)
(Continued)

(52) U.S. Cl.
CPC ............ *G06T 19/006* (2013.01); *G06F 3/011* (2013.01); *G06T 7/11* (2017.01); *G06T 7/194* (2017.01);
(Continued)

(58) Field of Classification Search
CPC ......... G06T 19/006; G06T 7/194; G06T 7/11; G06T 15/205; G06T 19/20; G06T 2207/10016; G06F 3/011
See application file for complete search history.

(56) References Cited

U.S. PATENT DOCUMENTS 5,751,850 A * 5/1998 Rindtorff ........... G06K 9/00154
382/178
6,020,891 A 2/2000 Rekimoto
(Continued)

FOREIGN PATENT DOCUMENTS

CA 2887596 7/2015
CN 103460256 A 12/2013
(Continued)

OTHER PUBLICATIONS

"Korean Application Serial No. 10-2019-7023098, Notice of Preliminary Rejection dated Oct. 8, 2020", w/ English translation, 15 pgs.
(Continued)

*Primary Examiner* — Phuc N Doan
(74) *Attorney, Agent, or Firm* — Schwegman Lundberg & Woessner, P.A.

(57) ABSTRACT

Aspects of the present disclosure involve a system comprising a computer-readable storage medium storing at least one program and a method for rendering virtual modifications to real-world environments depicted in image content. A reference surface is detected in a three-dimensional (3D) space captured within a camera feed produced by a camera of a computing device. An image mask is applied to the reference surface within the 3D space captured within the camera feed. A visual effect is applied to the image mask corresponding to the reference surface in the 3D space. The application of the visual effect to the image mask causes a modified surface to be rendered in presenting the camera feed on a display of the computing device.

20 Claims, 17 Drawing Sheets

(51) Int. Cl.
- *G06T 7/11* (2017.01)
- *G06F 3/01* (2006.01)
- *G06T 15/20* (2011.01)
- *G06T 19/20* (2011.01)

(52) U.S. Cl.
CPC ............ *G06T 15/205* (2013.01); *G06T 19/20* (2013.01); *G06T 2207/10016* (2013.01)

(56) References Cited

U.S. PATENT DOCUMENTS

| | | | |
|---|---|---|---|
| 6,038,295 | A | 3/2000 | Mattes |
| 6,980,909 | B2 | 12/2005 | Root et al. |
| 7,173,651 | B1 | 2/2007 | Knowles |
| 7,411,493 | B2 | 8/2008 | Smith |
| 7,535,890 | B2 | 5/2009 | Rojas |
| 8,131,597 | B2 | 3/2012 | Hudetz |
| 8,199,747 | B2 | 6/2012 | Rojas et al. |
| 8,332,475 | B2 | 12/2012 | Rosen et al. |
| 8,718,333 | B2 | 5/2014 | Wolf et al. |
| 8,724,622 | B2 | 5/2014 | Rojas |
| 8,730,156 | B2 | 5/2014 | Weising et al. |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,430,791 | B1 | 8/2016 | Sutton-shearer |
| 9,443,227 | B2 | 9/2016 | Evans et al. |
| 9,489,661 | B2 | 11/2016 | Evans et al. |
| 9,491,134 | B2 | 11/2016 | Rosen et al. |
| 9,517,403 | B1 | 12/2016 | Kim et al. |
| 9,576,201 | B2 * | 2/2017 | Wu .......................... G06K 9/628 |
| 9,633,447 | B2 | 4/2017 | Swaminathan et al. |
| 9,645,394 | B2 | 5/2017 | Kinnebrew et al. |
| 9,652,897 | B2 | 5/2017 | Osborn et al. |
| 9,789,403 | B1 | 10/2017 | Furment et al. |
| 9,980,100 | B1 | 5/2018 | Charlton et al. |
| 10,173,141 | B1 | 1/2019 | Schindler et al. |
| 10,242,503 | B2 | 3/2019 | McPhee et al. |
| 10,387,730 | B1 | 8/2019 | Cowburn et al. |
| 10,529,109 | B1 | 1/2020 | Chen et al. |
| 10,740,978 | B2 | 8/2020 | McPhee et al. |
| 10,990,246 | B1 | 4/2021 | Law et al. |
| 11,030,813 | B2 | 6/2021 | Hare et al. |
| 11,189,098 | B2 | 11/2021 | Hare et al. |
| 11,195,338 | B2 | 12/2021 | Mcphee et al. |
| 11,210,850 | B2 | 12/2021 | Goodrich et al. |
| 11,232,646 | B2 | 1/2022 | Goodrich et al. |
| 11,263,817 | B1 | 3/2022 | Goodrich et al. |
| 11,275,252 | B2 | 3/2022 | Boriskin et al. |
| 11,308,284 | B2 | 4/2022 | Huang et al. |
| 2004/0212630 | A1 | 10/2004 | Hobgood et al. |
| 2005/0041842 | A1 | 2/2005 | Frakes et al. |
| 2007/0018811 | A1 | 1/2007 | Gollu |
| 2007/0096678 | A1 | 5/2007 | Melrose |
| 2008/0078758 | A1 | 4/2008 | Shimura et al. |
| 2009/0160779 | A1 | 6/2009 | Crockett et al. |
| 2009/0215536 | A1 | 8/2009 | Yee et al. |
| 2010/0251101 | A1 | 9/2010 | Haussecker et al. |
| 2011/0161242 | A1 | 6/2011 | Chung et al. |
| 2011/0183732 | A1 | 7/2011 | Block et al. |
| 2011/0202598 | A1 | 8/2011 | Evans et al. |
| 2012/0002014 | A1 * | 1/2012 | Walsh .................. H04N 13/183 348/47 |
| 2012/0092329 | A1 | 4/2012 | Koo et al. |
| 2012/0120186 | A1 | 5/2012 | Diaz et al. |
| 2012/0194549 | A1 | 8/2012 | Osterhout et al. |
| 2012/0206558 | A1 | 8/2012 | Setton |
| 2012/0209924 | A1 | 8/2012 | Evans et al. |
| 2013/0021373 | A1 | 1/2013 | Vaught et al. |
| 2013/0050258 | A1 | 2/2013 | Liu et al. |
| 2013/0127980 | A1 | 5/2013 | Haddick et al. |
| 2013/0141434 | A1 | 6/2013 | Sugden et al. |
| 2013/0223673 | A1 | 8/2013 | Davis et al. |
| 2013/0278631 | A1 | 10/2013 | Border et al. |
| 2014/0028713 | A1 | 1/2014 | Keating et al. |
| 2014/0078176 | A1 | 3/2014 | Kim et al. |
| 2014/0176608 | A1 | 6/2014 | Boysen et al. |
| 2014/0267410 | A1 | 9/2014 | Fein et al. |
| 2014/0321702 | A1 | 10/2014 | Schmalstieg |
| 2014/0351758 | A1 | 11/2014 | Yoshida |
| 2015/0023602 | A1 * | 1/2015 | Wnuk .................. G06K 9/6202 382/190 |
| 2015/0098614 | A1 | 4/2015 | Gee et al. |
| 2015/0103183 | A1 | 4/2015 | Abbott et al. |
| 2015/0262029 | A1 | 9/2015 | Pirchheim et al. |
| 2015/0264304 | A1 | 9/2015 | Chastney et al. |
| 2015/0269783 | A1 | 9/2015 | Yun |
| 2015/0301599 | A1 | 10/2015 | Miller |
| 2015/0309698 | A1 | 10/2015 | Senderek et al. |
| 2016/0025978 | A1 | 1/2016 | Mallinson |
| 2016/0063600 | A1 | 3/2016 | Wuang |
| 2016/0073962 | A1 | 3/2016 | Yu et al. |
| 2016/0085773 | A1 | 3/2016 | Chang et al. |
| 2016/0109940 | A1 | 4/2016 | Lyren et al. |
| 2016/0171739 | A1 | 6/2016 | Anderson et al. |
| 2016/0330522 | A1 | 11/2016 | Newell et al. |
| 2016/0360115 | A1 | 12/2016 | Rim |
| 2016/0379418 | A1 * | 12/2016 | Osborn .................. G06T 11/40 345/589 |
| 2017/0038829 | A1 | 2/2017 | Lanier et al. |
| 2017/0039986 | A1 | 2/2017 | Lanier et al. |
| 2017/0069134 | A1 | 3/2017 | Shapira et al. |
| 2017/0090747 | A1 | 3/2017 | Dash |
| 2017/0103452 | A1 * | 4/2017 | Hertel .................. G06Q 20/047 |
| 2017/0178272 | A1 | 6/2017 | Lashkari et al. |
| 2017/0221272 | A1 | 8/2017 | Li et al. |
| 2017/0229153 | A1 | 8/2017 | Moore et al. |
| 2017/0243352 | A1 * | 8/2017 | Kutliroff ............... G06T 19/006 |
| 2017/0255450 | A1 | 9/2017 | Mullins et al. |
| 2017/0278308 | A1 * | 9/2017 | Bleiweiss .......... G06K 9/00664 |
| 2017/0287060 | A1 | 10/2017 | Choi et al. |
| 2017/0329488 | A1 | 11/2017 | Welker et al. |
| 2017/0361225 | A1 | 12/2017 | Goslin et al. |
| 2018/0040166 | A1 | 2/2018 | Jayaraj et al. |
| 2018/0061072 | A1 | 3/2018 | Benezra et al. |
| 2018/0082117 | A1 | 3/2018 | Sharma et al. |
| 2018/0082430 | A1 | 3/2018 | Sharma et al. |
| 2018/0108179 | A1 | 4/2018 | Tomlin et al. |
| 2018/0114365 | A1 | 4/2018 | Egri et al. |
| 2018/0122142 | A1 | 5/2018 | Egeler et al. |
| 2018/0143748 | A1 | 5/2018 | Ahmed et al. |
| 2018/0143950 | A1 | 5/2018 | Al-arnaouti et al. |
| 2018/0197343 | A1 | 7/2018 | Hare et al. |
| 2018/0210628 | A1 | 7/2018 | Mcphee et al. |
| 2018/0285647 | A1 | 10/2018 | Chen et al. |
| 2018/0336714 | A1 | 11/2018 | Stoyles et al. |
| 2018/0345129 | A1 * | 12/2018 | Rathod .................. A63F 13/213 |
| 2018/0349451 | A1 | 12/2018 | O'connell et al. |
| 2019/0004688 | A1 | 1/2019 | Bowen |
| 2019/0011703 | A1 | 1/2019 | Robaina et al. |
| 2019/0073834 | A1 | 3/2019 | Holzer et al. |
| 2019/0107991 | A1 | 4/2019 | Spivack et al. |
| 2019/0188920 | A1 | 6/2019 | Mcphee et al. |
| 2019/0221031 | A1 | 7/2019 | De La Carcova et al. |
| 2019/0251720 | A1 | 8/2019 | Hariton |
| 2019/0304189 | A1 | 10/2019 | Falstrup et al. |
| 2019/0311341 | A1 * | 10/2019 | Rice ..................... G06Q 20/12 |
| 2019/0385378 | A1 | 12/2019 | Bastian et al. |
| 2020/0066014 | A1 | 2/2020 | Mehta et al. |
| 2020/0066052 | A1 | 2/2020 | Antonsen et al. |
| 2020/0074738 | A1 | 3/2020 | Hare et al. |
| 2020/0082535 | A1 * | 3/2020 | Lindskog ........... G06K 9/00228 |
| 2020/0105006 | A1 | 4/2020 | Karsch et al. |
| 2020/0327734 | A1 | 10/2020 | Goodrich et al. |
| 2020/0334916 | A1 | 10/2020 | Mcphee et al. |
| 2020/0380259 | A1 | 12/2020 | Cahill et al. |
| 2020/0410763 | A1 | 12/2020 | Hare et al. |
| 2021/0074074 | A1 | 3/2021 | Goodrich et al. |

(56) References Cited

U.S. PATENT DOCUMENTS

| | | |
|---|---|---|
| 2021/0132686 A1 | 5/2021 | Awaji |
| 2021/0174600 A1 | 6/2021 | Hare et al. |
| 2021/0256773 A1 | 8/2021 | Hare et al. |
| 2021/0264668 A1 | 8/2021 | Goodrich et al. |
| 2022/0036660 A1 | 2/2022 | Mcphee et al. |
| 2022/0044311 A1 | 2/2022 | Ray |
| 2022/0076504 A1 | 3/2022 | Goodrich et al. |
| 2022/0121874 A1 | 4/2022 | Mayes et al. |

FOREIGN PATENT DOCUMENTS

| | | | |
|---|---|---|---|
| CN | 104764452 A | | 7/2015 |
| CN | 105607034 A | | 5/2016 |
| CN | 110168478 | | 8/2019 |
| CN | 112639691 A | | 4/2021 |
| CN | 113330484 A | | 8/2021 |
| CN | 114026831 A | | 2/2022 |
| CN | 114341780 | | 4/2022 |
| EP | 3086292 | | 10/2016 |
| EP | 3506213 | | 7/2019 |
| KR | 20130119473 A | | 10/2013 |
| KR | 20140020871 A | | 2/2014 |
| KR | 20150126938 A | | 11/2015 |
| KR | 102257167 B1 | | 5/2021 |
| KR | 102367928 | | 3/2022 |
| WO | 2011109126 | | 9/2011 |
| WO | 2018081125 | | 5/2018 |
| WO | 2018128930 | | 7/2018 |
| WO | 2018129531 | | 7/2018 |
| WO | WO-2020047117 A1 | | 3/2020 |
| WO | WO-2020132541 A1 | | 6/2020 |
| WO | 2020264551 | | 12/2020 |
| WO | 2020264551 | | 2/2021 |
| WO | WO-2021046582 A1 | | 3/2021 |

OTHER PUBLICATIONS

"International Application Serial No. PCT/US2020/070158, Invitation to Pay Additional Fees dated Oct. 1, 2020", 12 pgs.

"U.S. Appl. No. 16/696,600, Response filed Oct. 30, 2020 to Non Final Office Action dated Sep. 15, 2020", 8 pgs.

"U.S. Appl. No. 16/242,708, Notice of Allowance dated Nov. 4, 2020", 7 pgs.

"U.S. Appl. No. 16/457,461, Notice of Allowance dated Nov. 19, 2020", 8 pgs.

"U.S. Appl. No. 16/747,318, Non Final Office Action dated Dec. 15, 2020", 11 pgs.

"U.S. Appl. No. 16/696,600, Notice of Allowance dated Dec. 18, 2020", 11 pgs.

"International Application Serial No. PCT/US2020/070158, International Search Report dated Dec. 17, 2020", 5 pgs.

"International Application Serial No. PCT/US2020/070158, Written Opinion dated Dec. 17, 2020", 12 pgs.

"International Application Serial No. PCT/US2020/070503, International Search Report dated Dec. 2, 2020", 5 pgs.

"International Application Serial No. PCT/US2020/070503, Written Opinion dated Dec. 2, 2020", 7 pgs.

"Korean Application Serial No. 10-2019-7023098, Response filed Jan. 8, 2021 to Notice of Preliminary Rejection dated Oct. 8, 2020", w/ English Claims, 19 pgs.

"U.S. Appl. No. 16/696,600, Notice of Allowability dated Jan. 26, 2021", 2 pgs.

"U.S. Appl. No. 16/242,708, Notice of Allowance dated Feb. 4, 2021", 7 pgs.

"U.S. Appl. No. 16/242,708, Corrected Notice of Allowability dated Feb. 23, 2021", 2 pgs.

"U.S. Appl. No. 16/457,461, Corrected Notice of Allowability dated Feb. 26, 2021", 2 pgs.

Park, Jungsik, "[Poster] Interactive deformation of real objects", 2014 IEEE International Symposium on Mixed and Augmented Reality (ISMAR), (Sep. 10, 2014), 295-296.

"U.S. Appl. No. 16/242,708, Examiner Interview Summary dated Jul. 29, 2020", 3 pgs.

"U.S. Appl. No. 16/242,708, Final Office Action dated Jul. 2, 2020", 25 pgs.

"U.S. Appl. No. 16/242,708, Non Final Office Action dated Feb. 28, 2020", 19 pgs.

"U.S. Appl. No. 16/242,708, Notice of Allowance dated Aug. 19, 2020", 5 pgs.

"U.S. Appl. No. 16/242,708, Response filed May 15, 2020 to Non Final Office Action dated Feb. 28, 2020", 11 pgs.

"U.S. Appl. No. 16/242,708, Response filed Aug. 5, 2020 to Final Office Action dated Jul. 2, 2020", 11 pgs.

"U.S. Appl. No. 16/283,482, Notice of Allowance dated Apr. 2, 2020", 9 pgs.

"U.S. Appl. No. 16/283,482, Response filed Mar. 9, 2020 to Final Office Action dated Dec. 16, 2019", 11 pgs.

"U.S. Appl. No. 16/457,461, Examiner Interview Summary dated Jul. 10, 2020", 3 pgs.

"U.S. Appl. No. 16/457,461, Final Office Action dated Jul. 14, 2020", 16 pgs.

"U.S. Appl. No. 16/457,461, Non Final Office Action dated Apr. 16, 2020", 13 pgs.

"U.S. Appl. No. 16/457,461, Notice of Allowance dated Sep. 2, 2020", 7 pgs.

"U.S. Appl. No. 16/457,461, Response filed Jul. 1, 2020 to Non Final Office Action dated Apr. 16, 2020", 9 pgs.

"U.S. Appl. No. 16/457,461, Response filed Aug. 20, 2020 to Final Office Action dated Jul. 14, 2020", 8 pgs.

"U.S. Appl. No. 16/696,600, Non Final Office Action dated Sep. 15, 2020", 20 pgs.

"European Application Serial No. 18713732.8, Response to Communication Pursuant to Rules 161(1) and 162 EPC filed Feb. 19, 2020", 25 pgs.

"International Application Serial No. PCT/US2019/068007, International Search Report dated Apr. 30, 2020", 10 pgs.

"International Application Serial No. PCT/US2019/068007, Invitation to Pay Additional Fees dated Mar. 11, 2020", 18 pgs.

"International Application Serial No. PCT/US2019/068007, Written Opinion dated Apr. 30, 2020", 15 pgs.

Giaccone, P R, et al., "Foreground-background segmentation by cellular neural networks", IEEE 15th International Conference on Pattern Recognition (ICPR-2000), vol. 2, (2000), 438-441.

Kawai, Norihiko, et al., "Diminished Reality Based on Image Inpainting Considering Background Geometry", IEEE transactions on visualization and computer graphics, 22(3), (Mar. 1, 2016), 1236-1247.

Marto, Anabela G R, et al., "DinofelisAR Demo: Augmented Reality Based on Natural Features", 12th Iberian Conference on Information Systems and Technologies (CISTI), Lisbon, Portugal, (Jun. 2017), 6 pgs.

Nakajima, Yoshikatsu, et al., "Semantic Object Selection and Detection for Diminished Reality Based on SLAM with Viewpoint Class", IEEE International Symposium on Mixed and Augmented Reality Adjunct Proceedings, (2017), 338-343.

Robinson, Ian, "Add 3D text to video footage", Adobe.com/Youtube video, [Online] Retrieved from the Internet: <URL: https://helpx.adobe.com/after-effects/how-to/add-3d-text-video-footage.html>, (Mar. 10, 2017), 360 pgs.; 15:22.

Salas-Morena, Renato F, et al., "Dense Planar SLAM", IEEE Intl. Symposium on Mixed and Augmented Reality (ISMAR), Munich, Germany, [Online] Retrieved from the Internet: <URL: http://www.doc.ic.ac.uk/˜bglocker/pdfs/salas-moreno2014ismar.pdf>, (Sep. 2014), 8 pgs.

Schettini, R, et al., "A segmentation algorithm for color images", Pattern Recognition Letters, Elsevier, Amsterdam, NL, vol. 14, No. 6, (Jun. 1, 1993), 499-506.

Shohei, Mori, et al., "A survey of diminished reality: Techniques for visually concealing, eliminating, and seeing through real objects", IPSJ Transactions on Computer Vision and Applications, vol. 9, No. 1, (Jun. 28, 2017), 14 pgs.

"International Application Serial No. PCT/US2017/058093, International Search Report dated Jan. 4, 2018", 2 pgs.

(56) References Cited

OTHER PUBLICATIONS

"International Application Serial No. PCT/US2017/058093, Written Opinion dated Jan. 4, 2018", 4 pgs.
"International Application Serial No. PCT/US2017/068988, International Search Report dated Apr. 5, 2018", 3 pgs.
"International Application Serial No. PCT/US2017/068988, Written Opinion dated Apr. 5, 2018", 6 pgs.
"International Application Serial No. PCT/US2018/012967, International Search Report dated May 15, 2018", 5 pgs.
"International Application Serial No. PCT/US2018/012967, Written Opinion dated May 15, 2018", 6 pgs.
"U.S. Appl. No. 15/581,994, Non Final Office Action dated Jun. 26, 2018", 14 pgs.
"U.S. Appl. No. 15/863,575, Non Final Office Action dated Aug. 9, 2018", 14 pgs.
"U.S. Appl. No. 15/863,575, Response filed Sep. 24, 2018 to Non Final Office Action dated Aug. 9, 2018", 9 pgs.
"U.S. Appl. No. 15/581,994, Response filed Sep. 26, 2018 to Non Final Office Action dated Jun. 26, 2018", 11 pgs.
"U.S. Appl. No. 15/863,575, Notice of Allowance dated Nov. 15, 2018", 8 pgs.
"U.S. Appl. No. 15/581,994, Final Office Action dated Dec. 3, 2018", 18 pgs.
"U.S. Appl. No. 16/283,482, Non Final Office Action dated Jun. 26, 2019", 13 pgs.
"International Application Serial No. PCT/US2018/012967, International Preliminary Report on Patentability dated Jul. 18, 2019", 8 pgs.
"U.S. Appl. No. 16/283,482, Response filed Sep. 26, 2019 to Non Final Office Action dated Jun. 26, 2019", 13 pgs.
"International Application Serial No. PCT/US2019/048597, International Search Report dated Dec. 2, 2019", 5 pgs.
"International Application Serial No. PCT/US2019/048597, Written Opinion dated Dec. 2, 2019", 8 pgs.
"U.S. Appl. No. 16/283,482, Final Office Action dated Dec. 16, 2019", 15 pgs.
"U.S. Appl. No. 16/283,482, Examiner Interview Summary dated Feb. 19, 2020", 3 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Park, Jong-Seung, "Virtual Object Placement in Video for Augmented Reality", Advances in Multimedia Information Processing—PCM 2005: 6th Pacific Rim Conference on Multimedia, Jeju Island, KR, Proceedings (vol. 3767). Springer, Berlin, DE, (2005), 13-24.
"U.S. Appl. No. 16/457,461, Notice of Allowance dated Apr. 14, 2021", 7 pgs.
"U.S. Appl. No. 16/696,600, Corrected Notice of Allowability dated May 12, 2021", 2 pgs.
"U.S. Appl. No. 16/696,600, Notice of Allowance dated May 4, 2021", 9 pgs.
"U.S. Appl. No. 16/747,318, Examiner Interview Summary dated Mar. 12, 2021", 2 pgs.
"U.S. Appl. No. 16/747,318, Final Office Action dated May 12, 2021", 14 pgs.
"U.S. Appl. No. 16/747,318, Response filed Mar. 15, 2021 to Non Final Office Action dated Dec. 15, 2020", 11 pgs.
"U.S. Appl. No. 16/922,618, Non Final Office Action dated Apr. 27, 2021", 9 pgs.
"European Application Serial No. 21153993.7, Extended European Search Report dated May 12, 2021", 9 pgs.
"International Application Serial No. PCT/US2019/048597, International Preliminary Report on Patentability dated Mar. 11, 2021", 10 pgs.
U.S. Appl. No. 17/249,092, filed Feb. 19, 2021, 3D Object Camera Customization System.
"U.S. Appl. No. 16/457,461, Notice of Allowance dated Jul. 28, 2021", 5 pgs.
"U.S. Appl. No. 16/696,600, 312 Amendment filed Jul. 7, 2021", 7 pgs.
"U.S. Appl. No. 16/696,600, Corrected Notice of Allowability dated Jul. 21, 2021", 3 pgs.
"U.S. Appl. No. 16/696,600, Corrected Notice of Allowability dated Sep. 8, 2021", 2 pgs.
"U.S. Appl. No. 16/696,600, Notice of Allowance dated Aug. 17, 2021", 8 pgs.
"U.S. Appl. No. 16/747,318, 312 Amendment filed Nov. 5, 2021", 7 pgs.
"U.S. Appl. No. 16/747,318, Corrected Notice of Allowability dated Dec. 22, 2021", 2 pgs.
"U.S. Appl. No. 16/747,318, Notice of Allowance dated Sep. 9, 2021", 6 pgs.
"U.S. Appl. No. 16/747,318, PTO Response to Rule 312 Communication dated Nov. 23, 2021", 3 pgs.
"U.S. Appl. No. 16/747,318, Response filed Aug. 12, 2021 to Final Office Action dated May 12, 2021", 11 pgs.
"U.S. Appl. No. 16/922,618, Notice of Allowance dated Aug. 4, 2021", 9 pgs.
"U.S. Appl. No. 16/922,618, Response filed Jun. 17, 2021 to Non Final Office Action dated Apr. 27, 2021", 7 pgs.
"European Application Serial No. 19769288.2, Response filed Sep. 29, 2021 to Communication Pursuant to Rules 161(1) and 162 EPC dated Apr. 8, 2021", 24 pgs.
"International Application Serial No. PCT/US2019/068007, International Preliminary Report on Patentability dated Jul. 1, 2021", 17 pgs.
"Korean Application Serial No. 10-2021-7015384, Notice of Preliminary Rejection dated Jun. 11, 2021", With English translation, 13 pgs.
"Korean Application Serial No. 10-2021-7015384, Response filed Oct. 7, 2021 to Notice of Preliminary Rejection dated Jun. 11, 2021", w/ English Claims, 17 pgs.
You, Suya, et al., "Hybrid Inertial and Vision Tracking for Augmented Reality Registration", Proceedings IEEE Virtual Reality (Cat. No. 99CB36316), (1999), 8 pgs.
U.S. Appl. No. 15/863,575 U.S. Pat. No. 10,242,503, filed Jan. 5, 2018, Surface Aware Lens.
U.S. Appl. No. 16/283,482 U.S. Pat. No. 10,740,978, filed Feb. 22, 2019, Surface Aware Lens.
U.S. Appl. No. 16/922,618, filed Jul. 7, 2020, Surface Aware Lens.
U.S. Appl. No. 16/747,318, filed Jan. 20, 2020, Context-Based Virtual Object Rendering.
U.S. Appl. No. 16/696,600, filed Nov. 26, 2019, Rendering 3D Captions Within Real-World Environments.
U.S. Appl. No. 16/242,708, filed Jan. 8, 2019, Video Clip Object Tracking.
U.S. Appl. No. 16/457,461, filed Jun. 28, 2019, 3D Object Camera Customization System.
"U.S. Appl. No. 17/319,399, Non Final Office Action dated Apr. 22, 2022", 8 pgs.
"Chinese Application Serial No. 201880006129.X, Office Action dated Jan. 5, 2022", w/ English translation, 18 pgs.
"European Application Serial No. 19845741.8, Response filed Feb. 3, 2022 to Communication Pursuant to Rules 161 and 162 EPC dated Jul. 27, 2021", 19 pgs.
"International Application Serial No. PCT/US2020/070158, International Preliminary Report on Patentability dated Jan. 6, 2022", 14 pgs.
"International Application Serial No. PCT/US2020/070503, International Preliminary Report on Patentability dated Mar. 17, 2022", 9 pgs.
"Korean Application Serial No. 10-2022-7005953, Notice of Preliminary Rejection dated Apr. 4, 2022", w/ English Translation, 13 pgs.
"U.S. Appl. No. 17/249,092, Notice of Allowance dated May 4, 2022", 12 pgs.
"U.S. Appl. No. 17/307,354, Non Final Office Action dated Jun. 24, 2022", 29 pgs.
U.S. Appl. No. 17/817,491, filed Aug. 4, 2022, 3D Object Camera Customization System.
"U.S. Appl. No. 17/319,399, Response filed Jul. 21, 2022 to Non Final Office Action dated Apr. 22, 2022", 8 pgs.

(56) References Cited

OTHER PUBLICATIONS

"U.S. Appl. No. 17/249,092, Notice of Allowability dated Aug. 12, 2022", 2 pgs.
"U.S. Appl. No. 17/319,399, Notice of Allowance dated Aug. 25, 2022", 9 pgs.
"Chinese Application Serial No. 201880006129.X, Office Action dated Jun. 17, 2022", w English translation, 13 pgs.
"Chinese Application Serial No. 201880006129, Response filed Aug. 29, 2022 to Office Action dated Jun. 17, 2022", w/ English Claims, 14 pgs.
"Korean Application Serial No. 10-2022-7005953, Response filed Aug. 3, 2022 to Office Action dated Apr. 4, 2022", w/ English Claims, 20 pgs.

* cited by examiner

VIRTUAL SURFACE MODIFICATION

PRIORITY CLAIM

This application is a non-provisional of, and claims the benefit of priority under 35 U.S.C. § 119(e) from, U.S. Provisional Application Ser. No. 62/782,916, entitled "VIRTUAL SURFACE MODIFICATION," filed on Dec. 20, 2018, which is hereby incorporated by reference.

TECHNICAL FIELD

The present disclosure relates generally to visual presentations and more particularly to rendering virtual modifications to real-world environments depicted in a camera feed.

BACKGROUND

Virtual rendering systems can be used to create engaging and entertaining augmented reality experiences, in which three-dimensional (3D) virtual object graphics content appears to be present in the real-world. Such systems can be subject to presentation problems due to environmental conditions, user actions, unanticipated visual interruption between a camera and the object being rendered, and the like. This can cause a virtual object to disappear or otherwise behave erratically, which breaks the illusion of the virtual objects being present in the real-world. For example, a virtual rendering system may not present virtual objects in a consistent manner with respect to real-world items as a user moves about through the real-world.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject, matter may be practiced without these specific details. In general, well-known instruction instances, protocols, structures, and techniques are not necessarily shown in detail.

Among other things, embodiments of the present disclosure improve the functionality of electronic messaging and imaging software and systems by rendering virtual modifications to 3D real-world environments depicted in image data (e.g., images and video) as if the modifications exist the real-world environments. For example, the system may render one or more visual effects applied to a real-world surface within a 3D space depicted in image content generated by an image-capturing device (e.g., a digital camera). The one or more visual effects may be rendered such that the modified surface appears to exist in the real-world environment. Visual effects applied to real-world surfaces may be any of a wide range of visual effects including, for example, changing a color of the surface, changing a texture of the surface, applying an animation effect to the surface (e.g., flowing water), blurring the surface, rendering a moving virtual object whose movement is bounded by the boundaries of the surface, replacing the surface with other visual content, and various combinations thereof.

Figure 1:
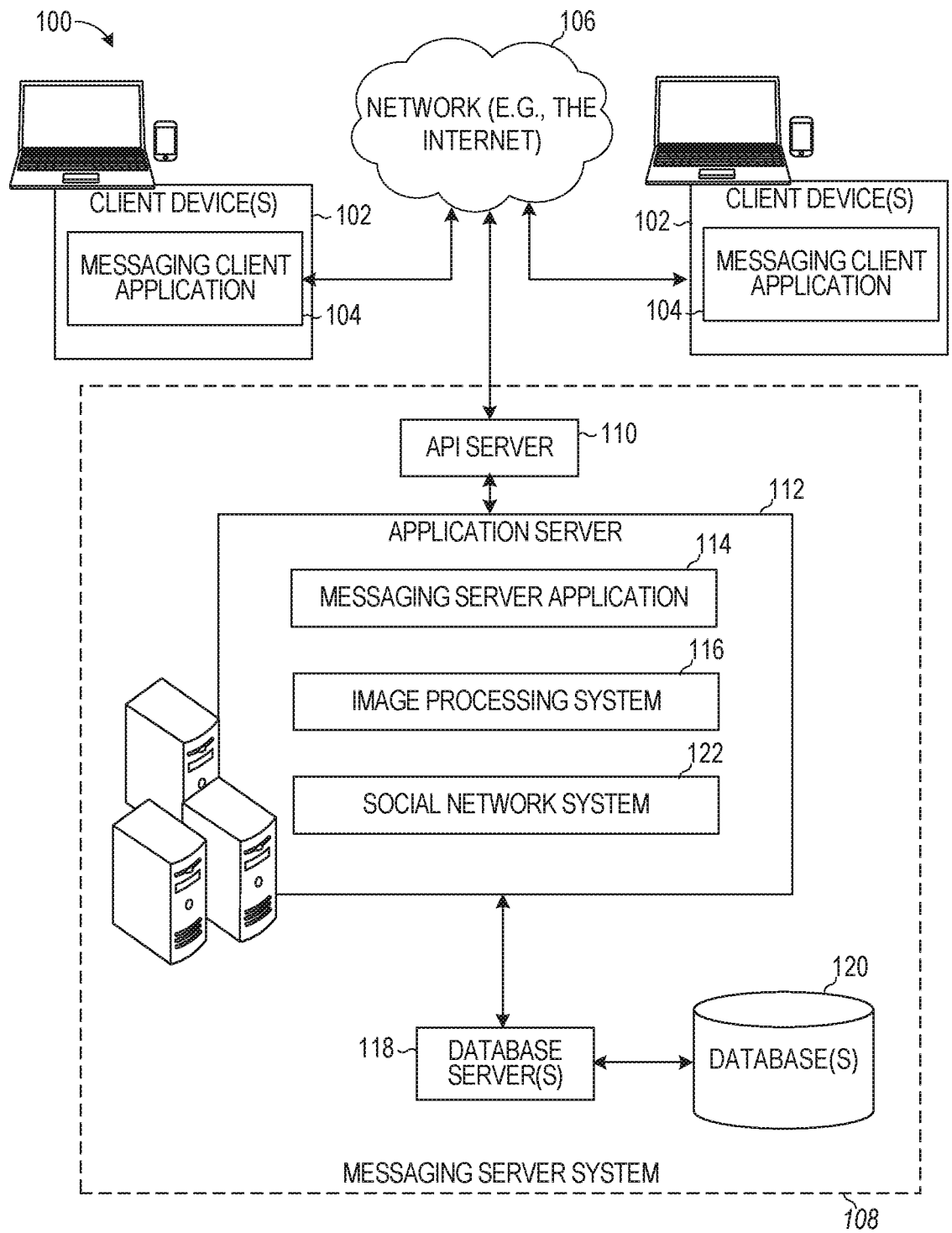
FIG. 1 is a block diagram showing an example messaging system for exchanging data (e.g., messages and associated content) over a network, according to example embodiments.

FIG. 1 is a block diagram showing an example messaging system 100 for exchanging data (e.g., messages and associated content) over a network. The messaging system 100 includes multiple client devices 102, each of which hosts a number of applications, including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of such collections, the retrieval of a list of friends of a user of a client device 102, the retrieval of messages and content, the adding and deleting of friends to a social graph, the location of friends within a social graph, opening an application event (e.g., relating to the messaging client application 104).

The application server 112 hosts a number of applications and subsystems, including a messaging server application 114, an image processing system 116, and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

As will be discussed below, the messaging server application 114 includes a virtual rendering system that provides functionality to generate, render, and track visual modifications within a 3D real-world environment depicted in a camera view of the client device 102.

The application server 112 also includes an image processing system 116 that is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
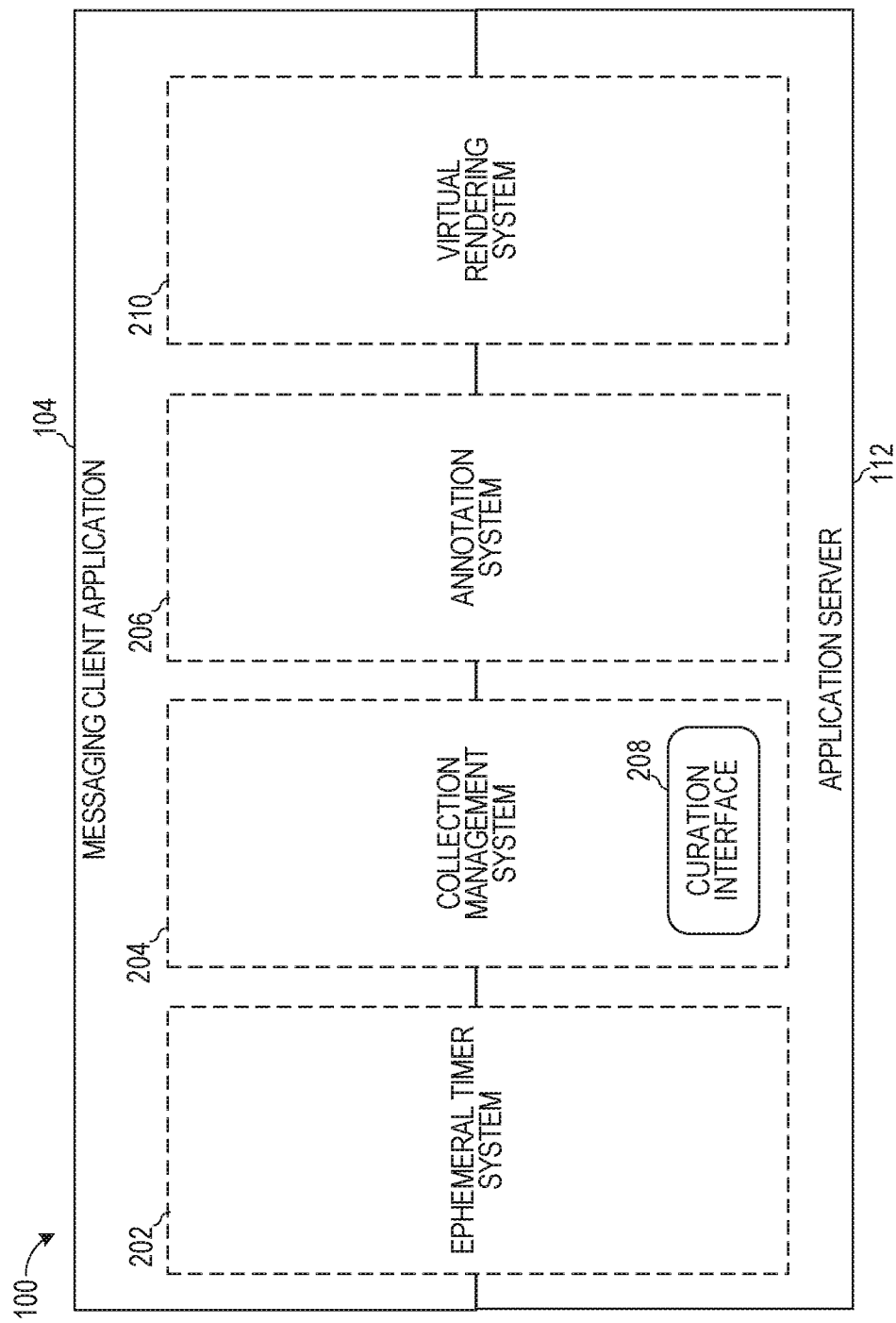
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a virtual rendering system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time The virtual rendering system 210 provides functionality to generate, render, and track virtual modifications within a 3D real-world environment depicted in a live camera feed of the client device 102 (also referred to by those of ordinary skill in the art as a "camera stream," "a video stream," or a "video feed"). The virtual modifications provided by the virtual rendering system 210 may include application of one or more visual effects to real-world surfaces depicted in the camera feed. The virtual modifications provided by the virtual rendering system 210 may also include virtual objects rendered within real-world environments depicted in the live camera feed of the client device 102.

Figure 3:
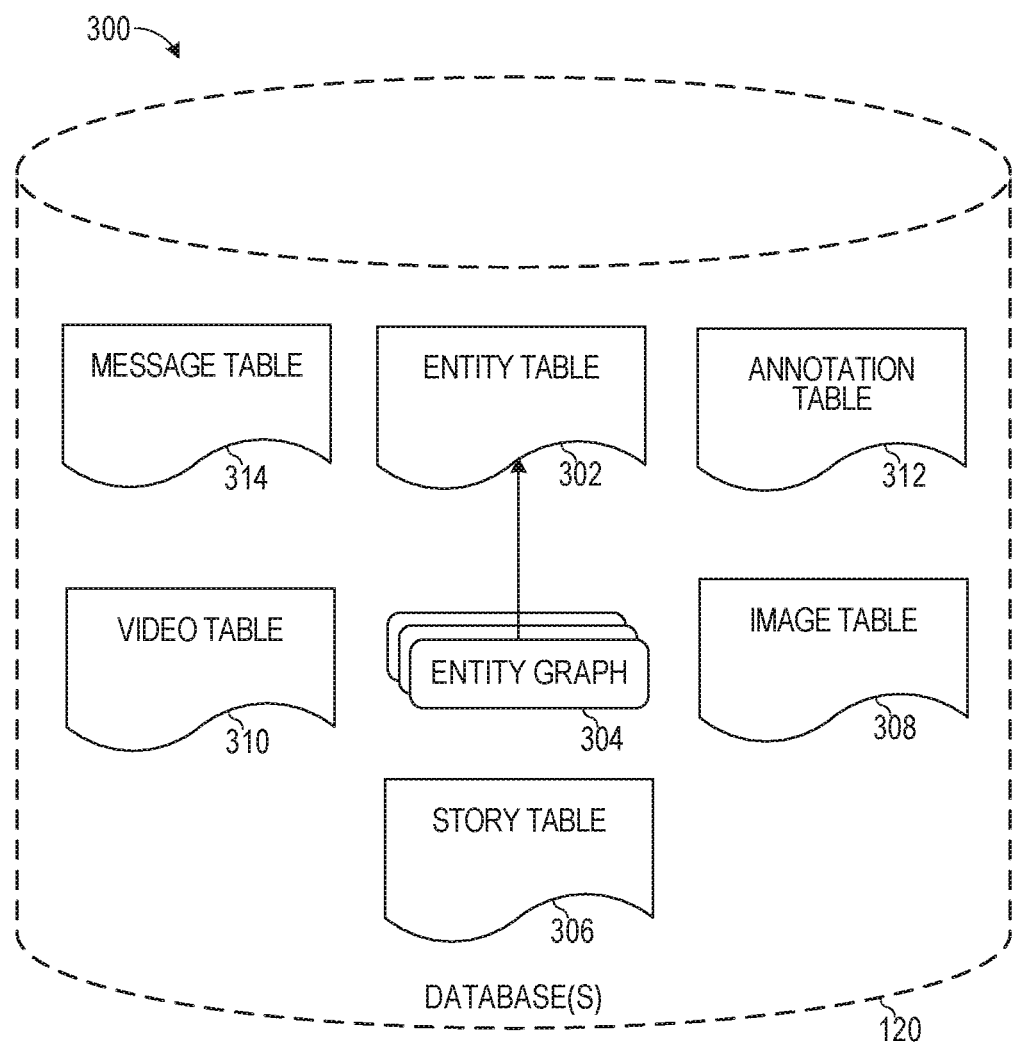
FIG. 3 is a schematic diagram illustrating data which may be stored in the database of the messaging server system, according to example embodiments.

FIG. 3 is a schematic diagram 300 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of filters and lenses, in an annotation table 312. Filters and lens for which data is stored within the annotation table 312 are associated with and applied to videos (for which data is stored in a video table 310) and/or images (for which data is stored in an image table 308). Filters are overlays that are displayed as overlaid on an image or video during presentation to a recipient user. Lenses include real-time visual effects and/or sounds that may be added to real-world environments depicted in a camera feed (e.g., while a user is viewing the camera feed via one or more interfaces of the messaging client application 104, while composing a message, or during presentation to a recipient user). In some embodiments, filters are applied to an image or video after the image or video is captured at the client device 102 while a lens is applied to the camera feed of the client device 102 such that when an image or videos is captured at the client device 102 with a lens applied, the applied lens is incorporated as part of the image or video that is generated. Filters and lenses may be of various types, including user-selected filters and lens from a gallery of filters or a gallery of lenses presented to a sending user by the messaging client application 104 when the sending user is composing a message.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the UI of the messaging client application 104 may include an icon that is user selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users, whose client devices have location services enabled and are at a common location event at a particular time, may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
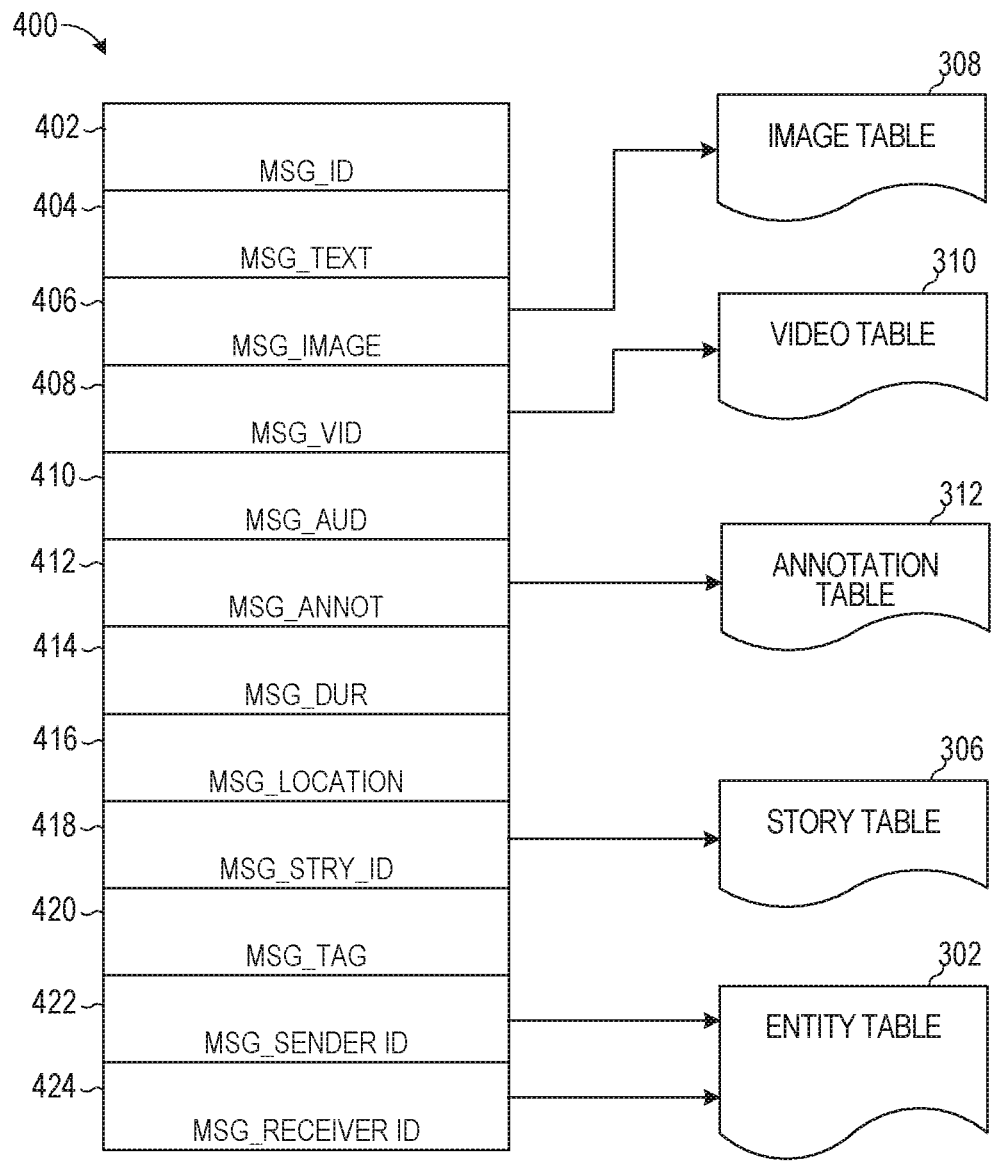
FIG. 4 is a schematic diagram illustrating a structure of a message generated by a messaging client application for communication, according to example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, with each of these parameter values being associated with respect to content items included in the content (e.g., a specific image into within the message image payload 406, or a specific video in the message video payload 408).
- A message story identifier 418: identifier value identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 102 on which the message 400 was generated and from which the message 400 was sent.
- A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
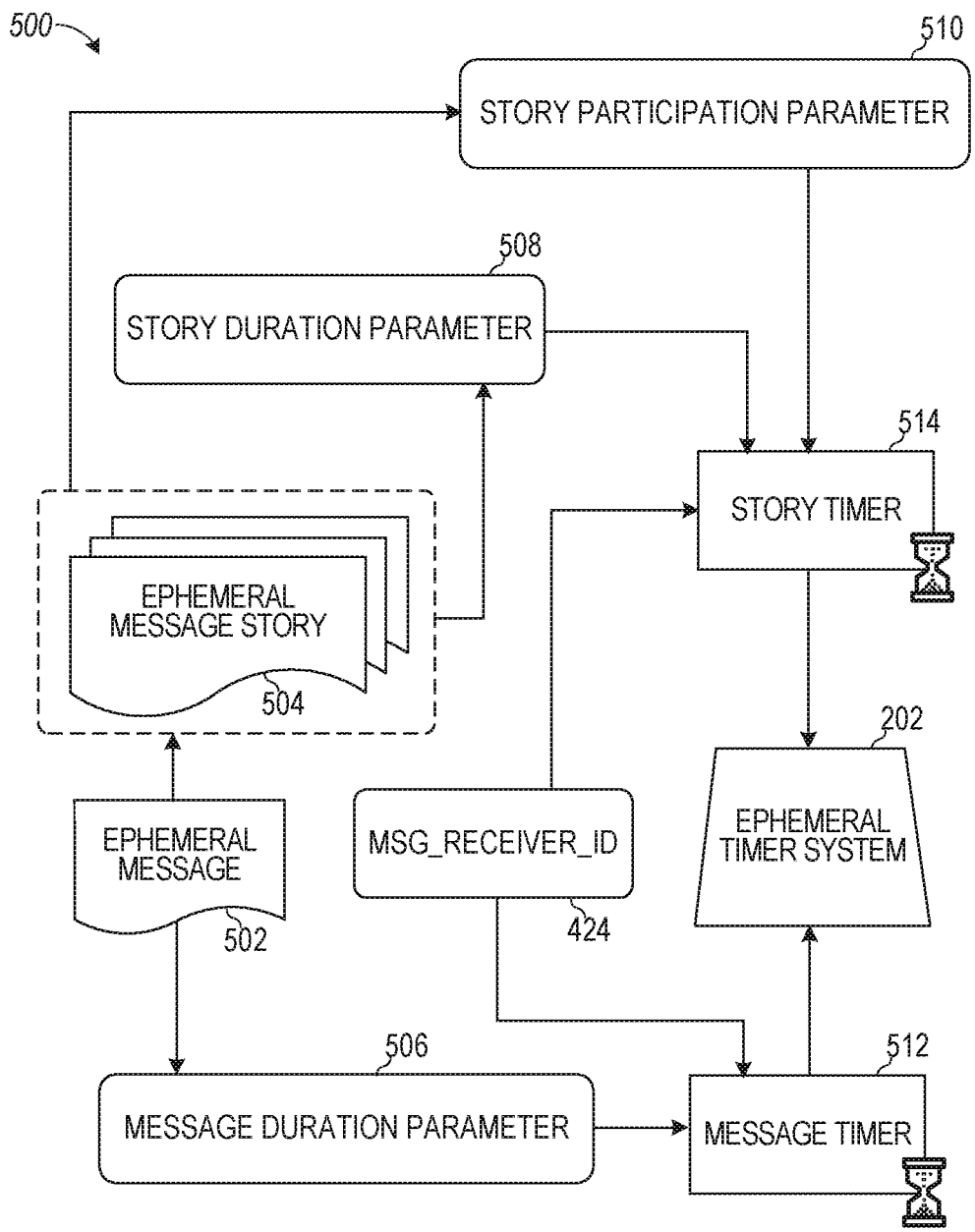
FIG. 5 is a schematic diagram illustrating an example access-limiting process, in terms of which access to content (e.g., an ephemeral message- and associated multimedia payload of data) or a content collection (e.g., an ephemeral message story) may be time-limited (e.g., made ephemeral), according to example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
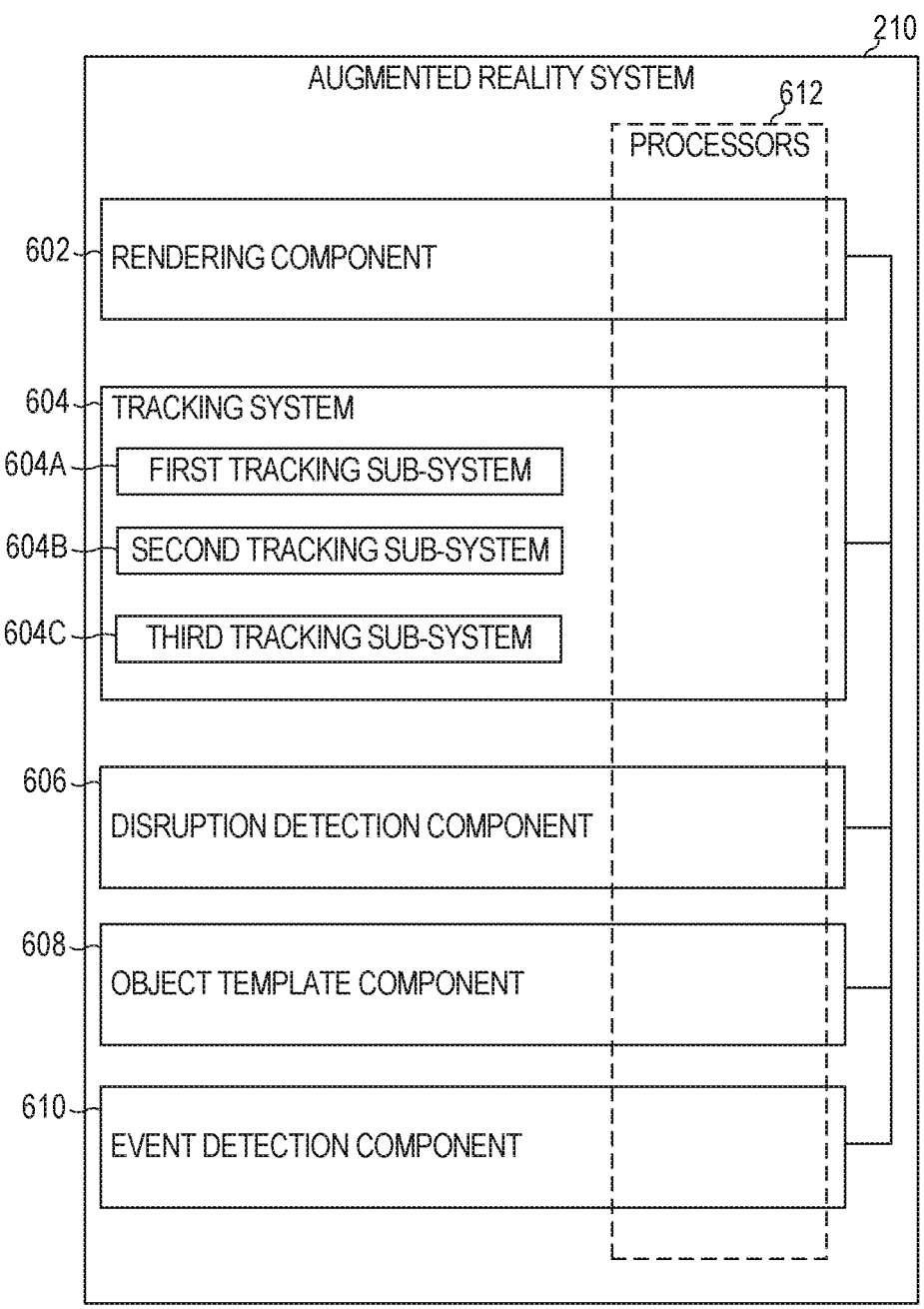
FIG. 6 is a block diagram illustrating various components of a virtual rendering system, according to example embodiments.

FIG. 6 is a block diagram illustrating functional components of the virtual rendering system 210 that configure the virtual rendering system 210 to render virtual modifications to a 3D real-world environment depicted in a live camera feed. For example, the virtual rendering system 210 may render virtual modifications to real-world surfaces in a 3D space depicted in a live camera feed. As another example, the virtual rendering system 210 may render virtual objects within the 3D space.

The virtual rendering system 210 is shown as including a rendering component 602, a tracking system 604, a disruption detection component 606, an object template component 608, and an event detection component 610. The various components of the virtual rendering system 210 may be configured to communicate with each other (e.g., via a bus, shared memory, or a switch). Although not illustrated in FIG. 6, in some embodiments, the virtual rendering system 210 may include or may be in communication with a camera configured to produce a camera feed comprising image data that includes a sequence of images (e.g., a video).

Any one or more of the components described may be implemented using hardware alone (e.g., one or more of the processors 612 of a machine) or a combination of hardware and software. For example, any component described of the virtual rendering system 210 may physically include an arrangement of one or more of the processors 612 (e.g., a subset of or among the one or more processors of the machine) configured to perform the operations described herein for that component. As another example, any component of the virtual rendering system 210 may include software, hardware, or both, that configure an arrangement of one or more processors 612 (e.g., among the one or more processors of the machine) to perform the operations described herein for that component. Accordingly, different components of the virtual rendering system 210 may include and configure different arrangements of such processors 612 or a single arrangement of such processors 612 at different points in time.

Moreover, any two or more components of the virtual rendering system 210 may be combined into a single component, and the functions described herein for a single component may be subdivided among multiple components. Furthermore, according to various example embodiments, components described herein as being implemented within a single machine, database, or device may be distributed across multiple machines, databases, or devices.

The tracking system 604 may comprise a first tracking sub-system 604A, a second tracking sub-system 604B, and a third tracking sub-system 604C. Each tracking sub-system tracks the position of a virtual modification to a 3D space based on a set of tracking indicia.

Tracking systems are subject to frequent tracking failure due to environmental conditions, user actions, unanticipated visual interruption between camera and object/scene being tracked, and so forth. Traditionally, such tracking failures would cause a disruption in the presentation of virtual objects in a 3D space. For example, a virtual object may disappear or otherwise behave erratically, thereby interrupting the illusion of the virtual object being presented within the 3D space. This undermines the perceived quality of the 3D experience as a whole.

Traditional tracking systems rely on a single approach (Natural Feature Tracking (NFT), Simultaneous Localization And Mapping (SLAM), Gyroscopic, etc.) that each have breaking points in real-world usage due to inaccurate sensor data, movement, loss or occlusion of visual marker, or dynamic interruptions to a scene. Further, each approach may have individual limitations in capability. For example, a gyroscopic tracking system can only track items with three degrees of freedom (3DoF). Further, utilization of a single tracking system provides inaccurate or unstable position estimation, due to inherent limitations of each individual system. For example, an NFT system may not provide sufficient pitch, yaw, or roll estimation due to the inaccuracies of visual tracking alone, while gyroscopic tracking systems provide inaccurate translation (up, down, left, right).

To address the foregoing issues with traditional tracking systems, the virtual rendering system 210 comprises multiple redundant tracking sub-systems 604A-C that enable seamless transitions between tracking sub-systems. The multiple redundant tracking sub-systems 604A-C address the issues with traditional tracking systems by merging multiple tracking approaches into a single tracking system 604. The tracking system 604 is able to combine 6DoF and 3DoF tracking techniques through combining and transitioning between multiple tracking systems based on the availability of tracking indicia tracked by the tracking systems. Thus, as the indicia tracked by any one tracking system becomes unavailable, the virtual rendering system 210 seamlessly switches between tracking in 6DoF and 3DoF, thereby providing the user with an uninterrupted experience. For example, in the case of visual tracking systems (e.g., NFT, SLAM), tracking indicia typically analyzed to determine orientation may be replaced with gyroscopic tracking indicia from a gyroscopic tracking system. This would thereby enable transitioning between tracking in 6Dof and 3DoF based on the availability of tracking indicia.

In some example embodiments, to transition between tracking in 6DoF and 3DoF, the virtual rendering system 210 gathers and stores tracking indicia within a tracking matrix that includes translation indicia (e.g., up, down, left, right) and rotation indicia (e.g., pitch, yaw, roll). The translation indicia gathered by an NFT system may thereby be extracted from the tracking matrix and utilized when future translation indicia gathered by the NFT system become inaccurate or unavailable. In the meantime, the rotation indicia continue to be provided by the gyroscope. In this way, when the mobile device loses tracking indicia, the tracked objects that are presented in the 3D space will not be changed abruptly at the frame when the tracking indicia are lost. Subsequently, when the target tracking object reappears in the screen, and a new translation $T_1$ is obtained, the translation part of the view matrix will then be taking advantage of the new translation $T_1$ and use $T_1$-$T_0$ as the translation of the view matrix.

The rendering component 602 of the virtual rendering system 210 is configured to render virtual modifications in a 3D space captured within a live camera feed produced by a camera of the client device 102. For example, the rendering component 602 may render a visual effect applied to real-world surface in a 3D space captured within the live camera feed. In rendering the modification, the virtual rendering system 210 dynamically applies an image mask to the surface depicted in the live camera feed and applies the visual effect to the image mask.

The virtual rendering system 210 may track and adjust the position of virtual modification by one or more tracking systems in 6DoF. For example, the one or more tracking systems of the virtual rendering system 210 may collect and analyze a set of tracking indicia (e.g., roll, pitch, yaw, natural features, etc.) in order to track the position of the virtual modification relative to the client device 102 in the 3D space with 6DoF. In such embodiments, the virtual rendering system 210 may transition between tracking systems based on the availability of the tracked indicia to maintain consistent tracking in 6DoF.

The disruption detection component 606 monitors tracking indicia to detect disruptions. Upon the disruption detection component 606 detecting an interruption of one or more indicia, such that tracking in 6DoF becomes unreliable or impossible, the virtual rendering system 210 transitions to tracking the virtual modification in the 3D space in 3DoF in order to prevent an interruption of the display. For example, the virtual rendering system 210 may transition from a first tracking system (or first set of tracking systems among the set of tracking systems) to a second tracking system among the set of tracking systems (or second set of tracking systems wherein the second tracking system is capable of tracking the virtual modification with 3DoF in the 3D space, based on the tracking indicia available.

In some example embodiments, the set of tracking systems of the virtual rendering system 210 includes a gyroscopic tracking system, an NFT system, and a SLAM tracking system. Each tracking system among the set of tracking systems may analyze tracking indicia in order to track a position of a virtual object within a 3D space. For example, to track a virtual object with 6DoF, the virtual rendering system 210 may require at least six tracking indicia to be available. As tracking indicia become obstructed or unavailable for various reasons, the virtual rendering system 210 may transition between the available tracking systems among the set of tracking systems in order to maintain 6DoF or transition to 3DoF, if necessary.

It will be readily appreciated that the virtual rendering system 210 provides consistent rendered virtual modifications (e.g., visual effects applied to real-world surface) in real-world 3D spaces in a wide variety of environments and situations. In many applications it can be desirable to provide firm consistency for the locations of these virtual modifications as one or more users, cameras, or other tracking items move around in the environment. This can involve the recognition and use of a specific fixed reference point (e.g., a fixed surface) in the real-world environment. Not using a fixed reference point or item can result in floating or other undesirable inconsistencies in the rendering and presentation of the virtual objects.

To ensure firm consistency in the location of virtual objects, annotation data in the example form of a presentation lens that is specific for virtual modification tracking and rendering described herein may be employed. In particular, a surface aware lens is a presentation lens that identifies and references a real-world surface (e.g., the ground) for the consistent rendering and presentation of virtual modifications in 3D space. The surface aware lens can be a specific portion or subcomponent within the rendering component 602. This surface aware lens of the rendering component 602 can be configured to recognize a reference surface based on visual camera content, and may also utilize other device inputs (e.g., gyroscope, accelerometer, compass) to determine what is an appropriate surface within a 3D space depicted in a live camera feed. Once the reference surface has been determined, then virtual modifications can be accomplished with respect to that reference surface. In an example, the reference surface in the 3D space is a ground surface. The virtual rendering system 210 may modify the ground surface as depicted in a live camera feed by applying a visual effect to the ground surface. The virtual rendering system 210 may also render a virtual object at a position in the 3D space such that the caption appears to be anchored to the ground surface.

In some embodiments, the virtual rendering system 210 may render a virtual modification to a 3D space depicted in a live camera feed of the client device 102 in response to a triggering event. To this end, the event detection component 610 is responsible for detecting such triggering events. The event detection component 610 may detect a triggering event based on data received from one or more components of the client device 102 or from one or more external sources accessible via the network 106. For example, the triggering event may be based on geolocation data from a location component of the client device 102, and the detecting of the triggering event may include detecting the client device 102 being at or near a particular geographic location. As another example, the triggering event may be based on a temporal factor and the detecting of the triggering event may include detecting a particular date or time based on a clock signal maintained by the client device 102. As yet another example, the triggering event may be based on weather data (e.g., obtained from an external source over the network 106) that describes weather conditions, and the detecting of the triggering event may include detecting a certain weather condition (e.g., snow, rain, wind, etc.).

Figure 7:
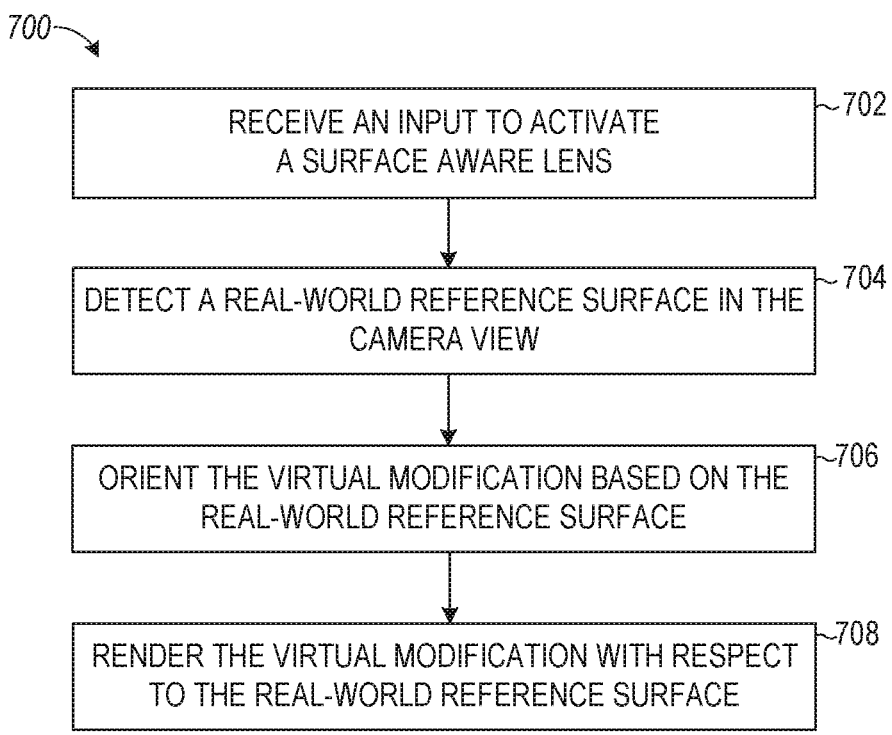
FIG. 7 is a flowchart illustrating example operations of the virtual rendering system in performing a method for rendering virtual modification to a 3D space, according to example embodiments.

FIG. 7 is a flowchart illustrating a method 700 for rendering a virtual modification in a 3D space, according to various embodiments of the present disclosure. The method 700 may be embodied in computer-readable instructions for execution by one or more processors such that the operations of the method 700 may be performed in part or in whole by the functional components of the virtual rendering system 210; accordingly, the method 700 is described below by way of example with reference thereto. However, it shall be appreciated that at least some of the operations of the method 700 may be deployed on various other hardware configurations and the method 700 is not intended to be limited to the virtual rendering system 210.

As depicted in operation 702, the virtual rendering system 210 receives an input to activate a surface aware lens. This input can be in the form of a manual user input, which can be, for example, a button tap or holding or pointing an active camera in such a manner so as to indicate selection of the surface aware lens. The surface aware lens may, for example, be used with any of the virtual objects for which a template is maintained by the object template component 608, although the surface aware lens is not limited in application to the virtual object templates maintained by the object template component 608.

At operation 704, the rendering component 602 responds to the input by detecting a real-world reference surface in 3D space depicted in a live camera feed produced by the camera. The camera feed comprises image data that includes a sequence of images video) in which the 3D space is depicted. In some embodiments, the reference surface can be a user specified reference surface. As such, the detecting of the reference surface is based on user input such as a tap or other gesture used to activate the surface lens to indicate a reference surface. Such a reference surface can be the floor surface or the ground surface in many cases, although other fixed and ascertainable surfaces can also be used. For example, the rendering component 602 may determine the reference surface by identifying a fixed surface based on an analysis of visual camera content and may also utilize other device inputs (e.g., gyroscope, accelerometer, compass) to ascertain what is an appropriate surface within a 3D space captured by the camera feed. In various embodiments, a confirmation that the proper reference surface has been indicated or highlighted can be requested from the user. In some situations, the system may indicate that a proper reference surface cannot be detected, such that further input or help from the user may be needed.

At operation 706, the rendering component 602 orients a virtual modification based on the detected reference surface. The orienting of the virtual modification may include assigning the virtual modification, such as a virtual object, to a position in 3D space based on the detected reference surface and identifying tracking indicia to be used by the tracking system 604 in tracking the virtual object in the 3D space. The position to which the virtual modification is assigned may correspond to the reference surface or a predefined distance above the reference surface. One or both of operations 704 and 706 can also be referred to as initialization of the rendering component 602. In essence, the determined reference surface within the camera feed is being established in the rendering component 602 at a proper static orientation relative to the reference surface in the real-world.

At operation 708, the rendering component 602 renders the virtual modification with respect to the reference surface. For example, the rendering component 602 may render a virtual object with respect to the reference surface. The rendering of the virtual object with respect to the reference surface may include rendering and maintaining the virtual object at the assigned position within the 3D space. Thus, in instances in which the assigned position is a predefined distance from the reference surface, the rendering of the virtual object may include rendering and maintaining the virtual object at the predefined distance from the reference surface. In these instances, the virtual object, when rendered, may not actually contact or rest against the reference surface, but rather may be hovering above or extending away from the reference surface at the predefined distance.

Figure 8:
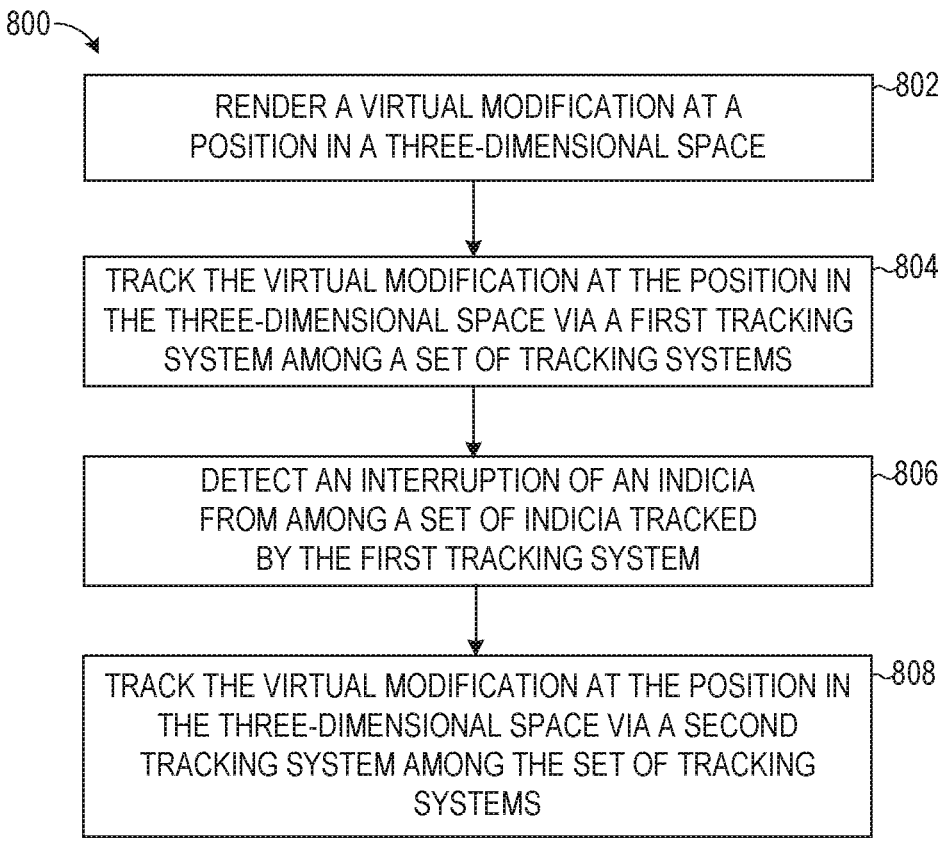
FIG. 8 is a flowchart illustrating example operations of the virtual rendering system in performing a method for tracking an object rendered in a 3D space, according to example embodiments.
Figure 9:
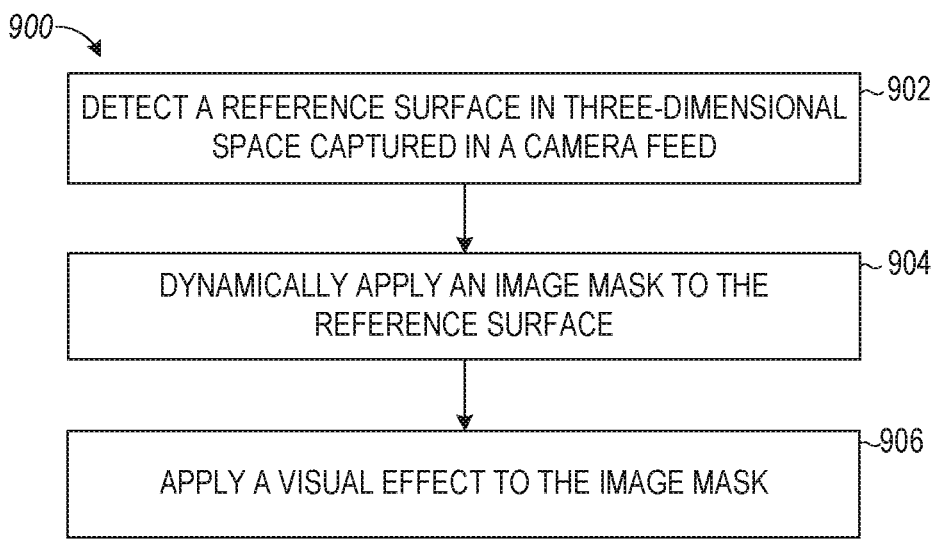
FIGS. 9-13 are flowcharts illustrating example operations of the virtual rendering system in performing a method for rendering a virtual modification to a surface in 3D space, according to example embodiments.

FIG. 8 is a flowchart illustrating operations of the virtual rendering system 210 in performing a method 800 for tracking virtual modification at a position relative to the client device 102 in a 3D space, according to certain example embodiments. The method 800 may be embodied in computer-readable instructions for execution by one or more processors such that the operations of the method 800 may be performed in part or in whole by the functional components of the virtual rendering system 210; accordingly, the method 800 is described below by way of example with reference thereto. However, it shall be appreciated that at least some of the operations of the method 800 may be deployed on various other hardware configurations and the method 800 is not intended to be limited to the virtual rendering system 210.

At operation 802, the rendering component 602 renders a virtual modification to a 3D space depicted in a camera feed at a position relative to the client device 102 in a 3D space.

At operation 804, the tracking system 604 tracks the virtual modification in 6DoF at the position in the 3D space via the first tracking sub-system 604A, or a combination of multiple tracking sub-systems (e.g., the first tracking sub-system 604A and the second tracking sub-system 604B), based on a set of tracking indicia. When tracking the virtual modification in 6DoF, a user viewing the modification on the client device 102 can turn or move in any direction without disrupting tracking of the modification. For example, the tracking system 604 may track the position of the virtual modification based on a combination of an NFT system and a gyroscopic tracking system.

At operation 806, the disruption detection component 606 detects an interruption of a tracking indicia from among the tracking indicia tracked by the tracking sub-systems (e.g., the first tracking sub-system 604A). For example, the first tracking sub-system 604A may include a NFT system configured to rely on tracking indicia that include features of an environment or active light sources in proximity to virtual modifications within the environment (e.g., the ground's plane, or the horizon). The NFT system of the first tracking sub-system 604A may therefore rely on the positions of three or more known features in the environment to determine the position of the virtual modifications relative to the client device 102 in the 3D space. Should any one or more of the tracking indicia tracked by the first tracking sub-system 604A become obstructed or unavailable, the tracking of the virtual modification in the 3D space would become disrupted.

At operation 808, in response to the disruption detection component 606 detecting a disruption of one or more tracking indicia, the tracking system 604 transitions to one or more other tracking sub-systems (e.g., the second tracking sub-system 604B and/or the third tracking sub-system 604C) to maintain tracking of the virtual object relative to the client device 102 in the 3D space. In doing so, the virtual rendering system 210 may transition from 6DoF to 3DoF, wherein 3DoF measures pitch, roll, and yaw, but does not measure translations. As the tracking indicia again become available, the virtual rendering system 210 may thereby transition from 3DoF back to 6DoF. For example, when the NFT system becomes unavailable, the tracking system 604 may utilize the last tracking indicia gathered and tracked by the NET system throughout the subsequent 3DoF experience.

FIGS. 9-13 are flowcharts illustrating example operations of the virtual rendering system in performing a method 900 for rendering a virtual modification to a surface in 3D space, according to example embodiments. The method 900 may be embodied in computer-readable instructions for execution by one or more processors such that the operations of the method 900 may be performed in part or in whole by the functional components of the virtual rendering system 210; accordingly, the method 900 is described below by way of example with reference thereto. However, it shall be appreciated that at least some of the operations of the method 900 may be deployed on various other hardware configurations and the method 900 is not intended to be limited to the virtual rendering system 210.

At operation 902, the rendering component 602 detects a reference surface in a 3D space depicted in a camera feed produced by a camera of a computing device (e.g., the client device 102). The camera feed comprises a sequence of images, with each image depicting the 3D space. As previously noted, the reference surface may be the ground surface, although any other fixed and ascertainable surfaces may also be used. For example, the rendering component 602 may detect the reference surface by identifying a fixed surface based on an analysis of visual camera content, and may also utilize other device inputs (e.g., gyroscope, accelerometer, compass) to ascertain what is an appropriate surface within the 3D space depicted in the camera feed.

In some embodiments, the detecting of the reference surface may be based on user input received on a presentation of the camera feed. This input can be in the form of a manual user input, which can be, for example, a button tap or holding or pointing an active camera in such a manner so as to indicate that a surface is being referenced. In other embodiments, which will be discussed below in reference to FIG. 10, the detecting of the reference surface may be in response to detecting a triggering event associated with the reference surface.

At operation 904, the rendering component 602 dynamically applies an image mask to the reference surface within the 3D space depicted within the camera feed. More specifically, the rendering component 602 applies an image mask to each of the multiple images of the camera feed at the location of the reference surface depicted in each image, which may vary due to changes in the orientation or distance of the camera relative to the reference surface. In general, the applying of the image mask to each image includes classifying pixels in the image based on whether they are inside or outside of the boundaries of the reference surface. Such a pixel classification process may be based on a determined geometry of the 3D space, determined regions of color within an image, or determined regions of photometric consistency within an image.

In some embodiments, the applying of the image mask may comprise applying an image segmentation neural network to the multiple images of the camera feed. The image segmentation neural network may be trained to perform image segmentation on the images to partition each image into multiple image segments (e.g., sets of pixels). More specifically, the image segmentation neural network may be trained to assign a first label to pixels that are inside the boundaries of the reference surface and assign a second label to pixels that are outside the boundaries of the reference surface. The applying of the image segmentation neural network to an image of the camera feed yields a segmented image with two image segments a first image segment that includes a first set of pixels assigned to the first label corresponding to the reference surface; and a second image segment that includes a second set of pixels assigned to the second label corresponding to the remainder of the 3D space depicted in the image.

Figure 14A:
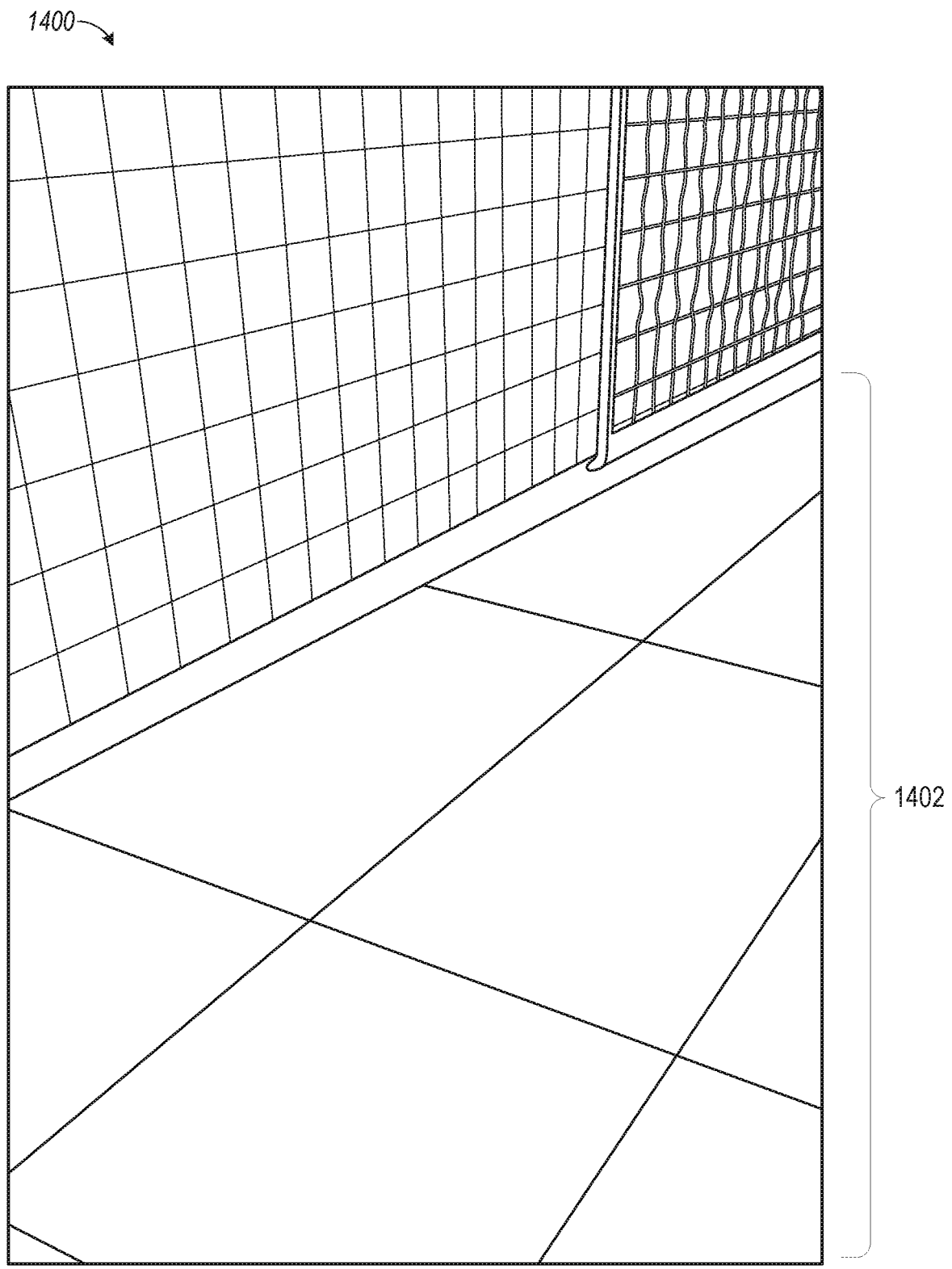
FIGS. 14A and 14B are interface diagrams illustrating an interface provided by the virtual rendering system, according to example embodiments.
Figure 14B:
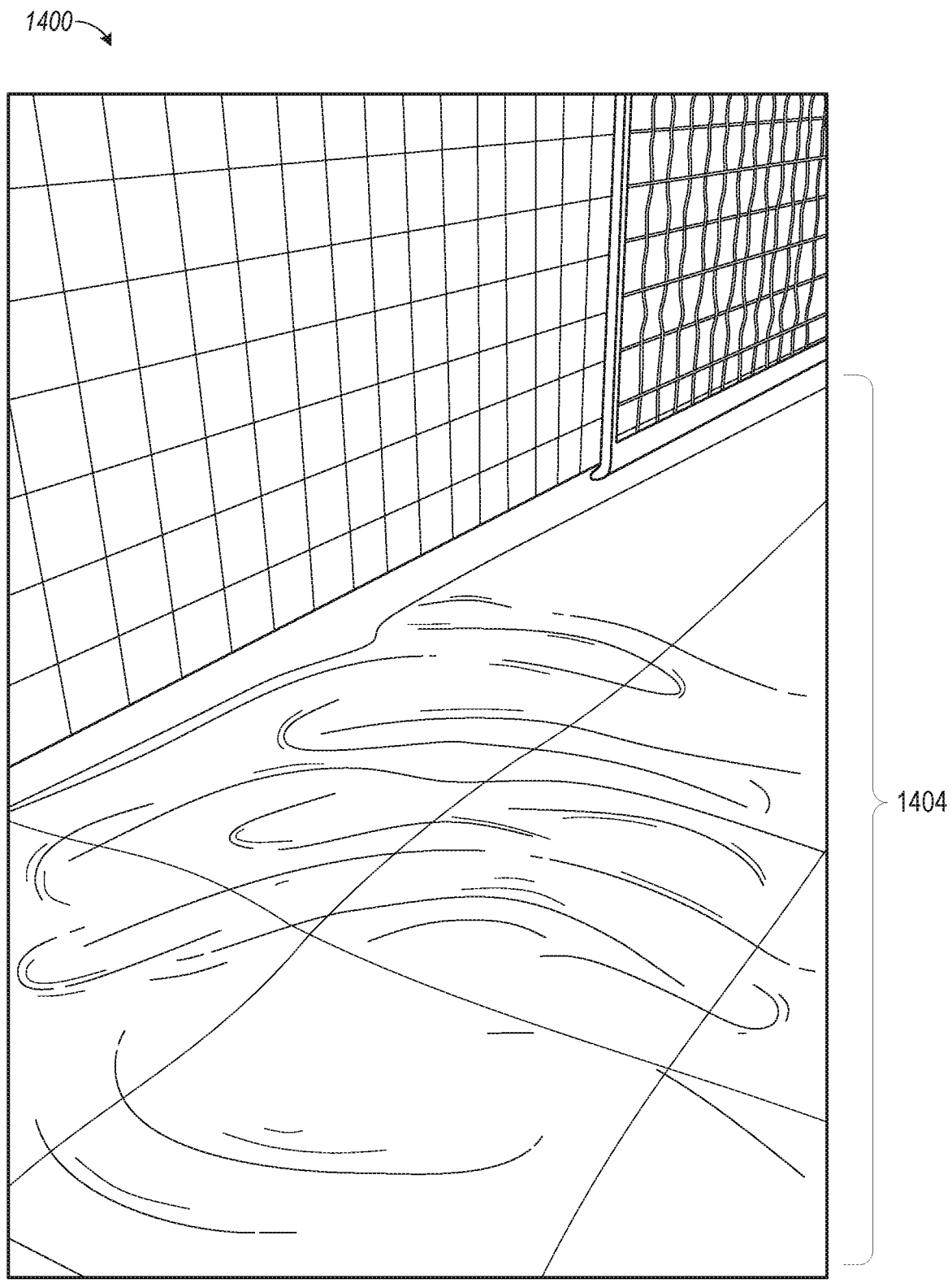

At operation 906, the rendering component 602 applies a visual effect to the image mask corresponding to the reference surface. The applying of the visual effect to the image mask causes a modified surface to be rendered in a presentation of the camera feed on a display of the computing device. The visual effect may be any of a wide range of visual effects including, for example, changing a color of the surface, changing a texture of the surface, applying an animation effect to the surface (e.g., flowing water), blurring the surface, rendering a moving virtual object whose movement is bounded by the boundaries of the surface, replacing the surface with other visual content, and various combinations thereof. An example application of a visual effect to a reference surface is illustrated in FIGS. 14A and 14B and described below.

Figure 10:
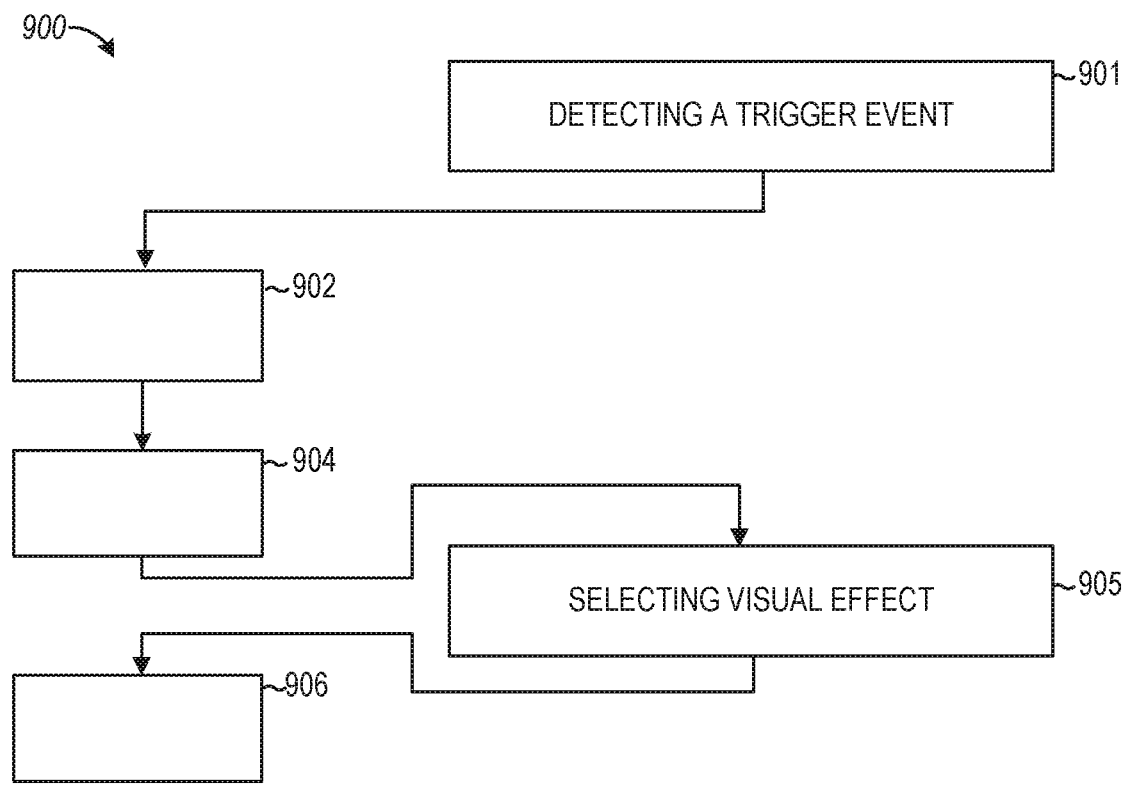

As shown in FIG. 10, the method 900 may, in some embodiments, also include operations 901 and 905. The operation 901 may be performed prior to operation 902, wherein the rendering component 602 detects the reference surface in the 3D space captured in the camera feed. At operation 901, the event detection component 610 detects a triggering event. The triggering event may, for example, be based on geolocation data from a location component of the computing device. As an example, the detecting of the triggering event may include detecting when the computing device is within a predefined distance of the geographic location. As an additional example, the triggering event may be based on temporal factors and thus, the detecting the triggering event may include detecting a particular date or time. As yet another example, the triggering event may be based on weather conditions, and thus, the detecting of the triggering event may include detecting certain weather condition (e.g., snow, rain, wind, etc.).

The operation 905 may be performed prior to operation 906, where the rendering component 602 applies a visual effect to the image mask. At operation 905, the rendering component 602 selects the visual effect to be subsequently applied to the image mask. In some embodiments, the rendering component 602 selects the visual effect based on previous user input that specified a particular visual effect.

In some embodiments, the triggering event detected at operation 901 is associated with a particular visual effect, and thus, the rendering component 602 may select the graphical event based on the triggering event. For example, a particular visual effect may be associated with a particular geographic location, and when the event detection component 610 detects the computing device being within the predefined distance of the geographic location, the rendering component 602 selects the visual effect associated with the geographic location.

Figure 11:
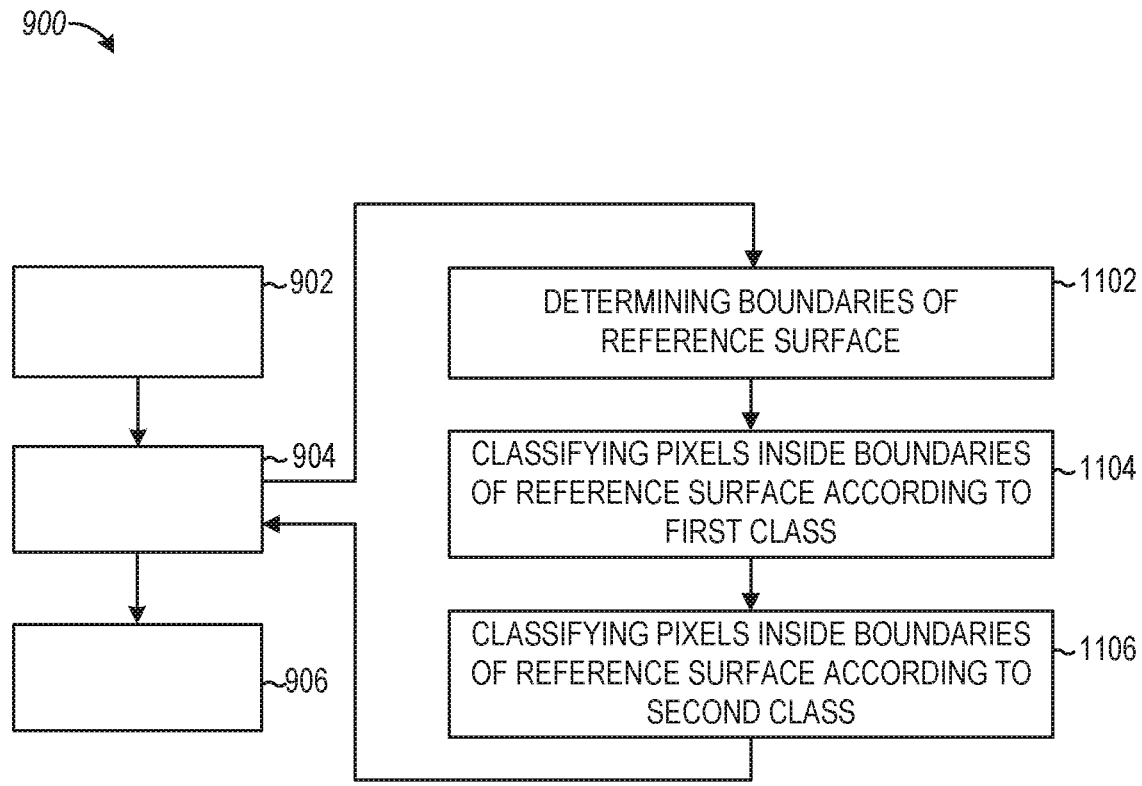

As shown in FIG. 11, the method 900 may, in some embodiments, also include operations 1102, 1104, and 1106. One or more of the operations 1102, 1104, and 1106 may be performed as part of (e.g., a precursor task, a subroutine, or a portion) operation 904 where the rendering component 602 applies the image mask to the reference surface. The operations 1102, 1104, and 1106 are described below in reference to a single image from the camera feed, though it shall be appreciated that the operations 1102, 1104, and 1106 may be repeated for each image of the camera feed to achieve the dynamic application of the image mask to the reference surface as depicted in the camera feed as a whole.

At operation 1102, the rendering component 602 determines the boundaries of the reference surface within the 3D space depicted in an image of the camera feed. In determining the boundaries of the reference surface, the rendering component 602 may, for example, employ one of many known edge detection techniques. Further details regarding the determining of the boundaries of the reference surface, according to some embodiments, are discussed below in reference to FIGS. 12 and 13.

At operation 1104, the rendering component 602 classifies pixels in the image that are inside the boundaries of the references surface according to a first class. At operation 1106, the rendering component 602 classifies pixels in the image that are outside the boundaries of the references surface according to a second class. The pixels classified according to the first class form the image mask for the reference surface.

It shall be appreciated that although FIG. 11 illustrates the operation of determining the boundaries of the reference surface (operation 1102) as being separate and distinct from operations 1104 and 1106, the determination of the boundaries of the reference surface may, in some embodiments, be combined and performed as part of the operations 1104 and 1106.

Figure 12:
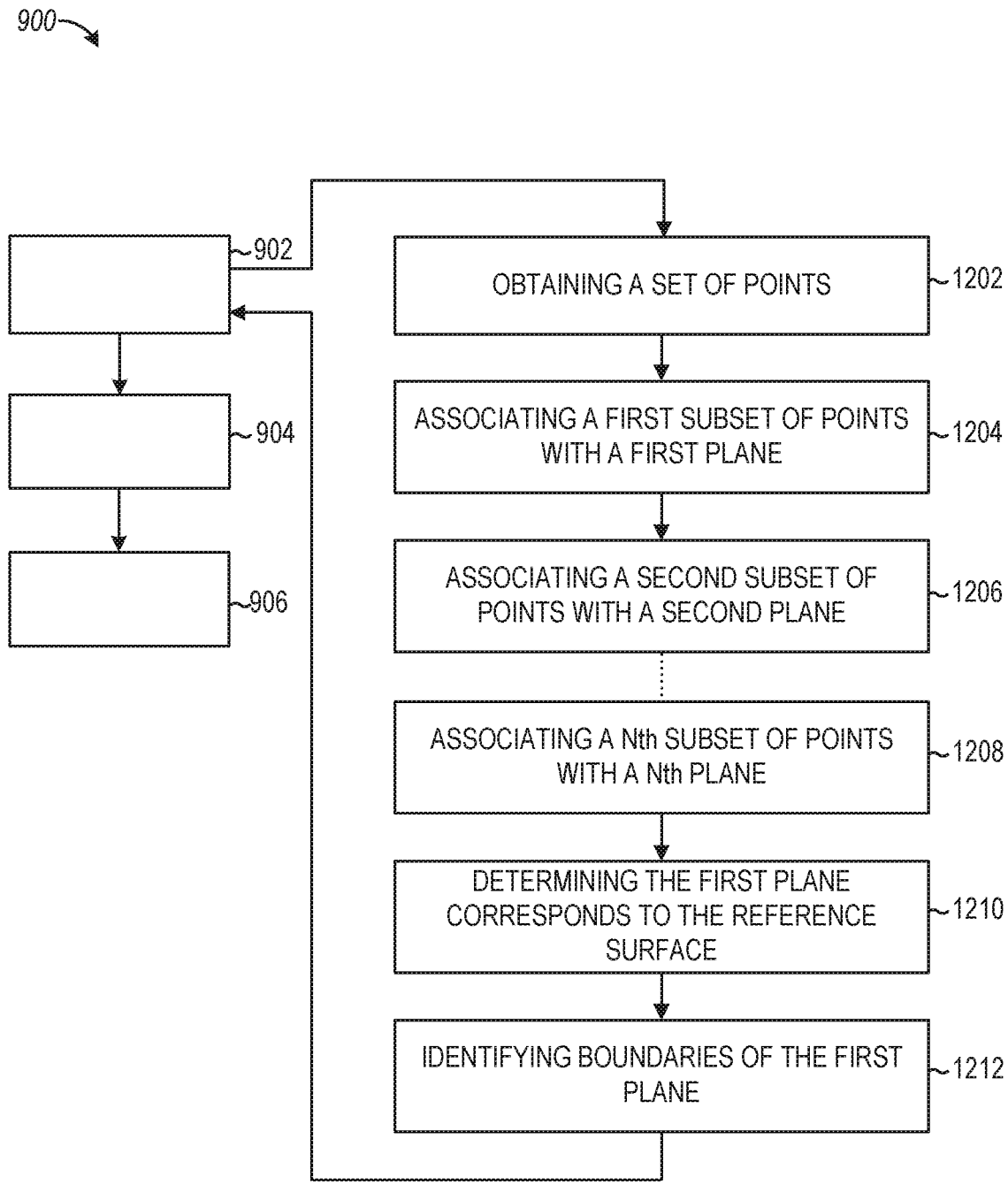

As shown in FIG. 12, the method 900 may, in some embodiments, further include operations 1202, 1204, 1206, 1208, 1210, and 1212. The operations 1202, 1204, 1206, 1208, 1210, and 1212 may, in some embodiments, be performed as part of (e.g., a precursor task, a subroutine, or a portion) operation 1004 where the rendering component 602 applies the image mask to reference surface. In some embodiments, the operations 1202, 1204, 1206, 1208, 1210, and 1212 may be performed specifically as part of (e.g., a precursor task, a subroutine, or a portion) operation 1202 where the rendering component 602 determines the boundaries of the reference surface.

At operation 1202, the rendering component 602 obtains a set of points from the multiple images of the camera feed. The obtaining of the set of points may including sampling a set of pixels randomly selected from the camera feed.

At operation 1204, the rendering component 602 associates a first subset of the set of points with a first plane in the 3D space depicted in the image. At operations 1206-1208, the rendering component 602 respectively associates a second-Nth subset of the set of points with a second-Nth plane in 3D space depicted in the image. The rendering component 602 may associate each subset of points with a corresponding plane in the 3D space based on a determined geometry of the 3D space, sensor data from one or more sensors of the computing device (e.g., a gyroscope and accelerometer), location data from one or more location components (e.g., compass and global positioning system (GPS)), or various combinations of both. For example, the associating of the set of points with a corresponding plane may include determining a location and orientation of the camera with respect to the plane based in part on sensor data. (e.g., gyroscope and accelerometer) and mapping pixels locations in the images to locations in the 3D space based in part on location data.

At operation 1210, the rendering component 602 determines the first plane corresponds to the detected reference surface. At operation 1212, the rendering component 602 identifies the boundaries of the first plane and in doing so, the rendering component 602 determines the boundaries of the reference surface.

Figure 13:
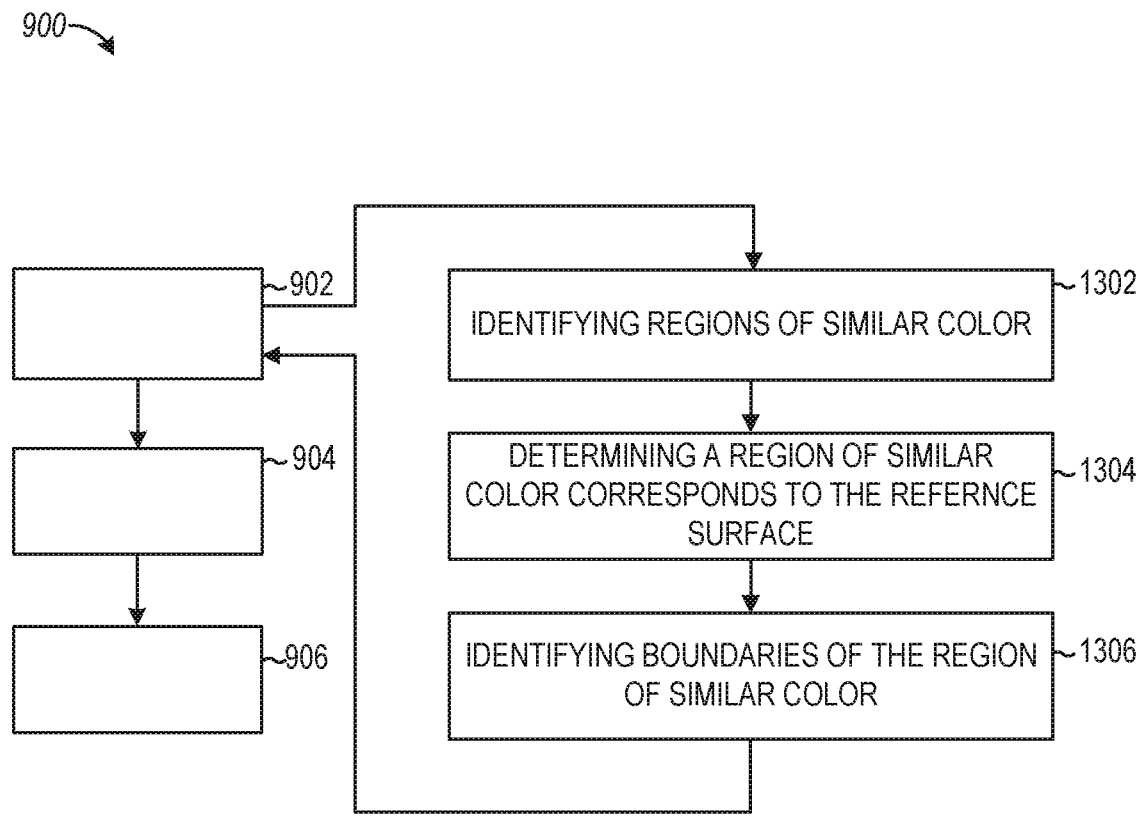

As shown in FIG. 13, the method 1000 may, in some embodiments, further include operations 1302, 1304, and 1306. The operations 1302, 1304, and 1306 may, in some embodiments, be performed as part of (e.g., a precursor task, a subroutine, or a portion) operation 1004 where the rendering component 602 applies the image mask to reference surface. In some embodiments, the operations 1302, 1304, and 1306 may be performed specifically as part of (e.g., a precursor task, a subroutine, or a portion) operation 1202 where the rendering component 602 determines the boundaries of the reference surface. The operations 1302, 1304, and 1306 are described below in reference to a single image from the camera feed, though it shall be appreciated that the operations 1302, 1304, and 1306 may be repeated for each image of the camera feed to achieve the dynamic application of the image mask to the reference surface as depicted in the camera feed as a whole.

At operation 1302, the rendering component 602 identifies regions of similar color in an image of the camera feed. The identifying of the regions of similar color may include associating groupings of pixels in the image based on pixel color values. More specifically, the rendering component 602 may associate groupings of pixels based on pixels within the groupings having pixel color values that do not exceed a threshold standard deviation.

At operation 1304, the rendering component 602 determines which region of similar color corresponds to the detected reference surface. At operation 1306, the rendering component 602 identifies the boundaries of the region of similar color that corresponds to the reference surface thereby determining the boundaries of the reference surface.

FIGS. 14A and 14B are interface diagrams illustrating aspects of interface provided by the virtual rendering system 210, according to example embodiments. With reference to FIG. 14A, a camera feed 1400 is shown. The camera feed 1400 may be displayed on a display of a computing device (e.g., client device 102) and although FIG. 14A only illustrates a single image, the camera feed 1400 may comprise a sequence of images (e.g., a video) produced by a camera of the computing device. Although FIG. 14A illustrates the camera feed 1400 being displayed in isolation, the camera feed 1400 may be presented within or as part of a user interface element that is displayed among other user interface elements that facilitate functionality that allows a user to interact with the camera feed 1400 in various ways.

A 3D real-world environment is depicted within the camera feed 1400. In particular, the 3D real-world environment depicted within the camera feed includes a sidewalk surface 1402. The virtual rendering system 210 may analyze the camera, feed 1400, utilizing other device inputs such as a gyroscope, accelerometer, and compass to identify the sidewalk surface 1402, and dynamically apply an image mask to the sidewalk surface 1402, in accordance with any one of the methodologies described above. The virtual rendering system 210 may modify the sidewalk surface 1402 as presented in the camera feed 1400 by applying a visual effect to the image mask corresponding to the sidewalk surface 1402. The applying of the visual effect to the image mask causes a modified surface to be rendered in a presentation of the camera feed 1400.

For example, FIG. 14B illustrates a modified surface 1404 presented within the camera feed 1400. The modified surface 1404 corresponds to the sidewalk surface 1402 with an applied visual effect. In particular, the modified surface 1402 includes an animation that makes the sidewalk surface 1402 appear in the camera feed 1400 to be flowing water rather than a sidewalk.

Figure 15:
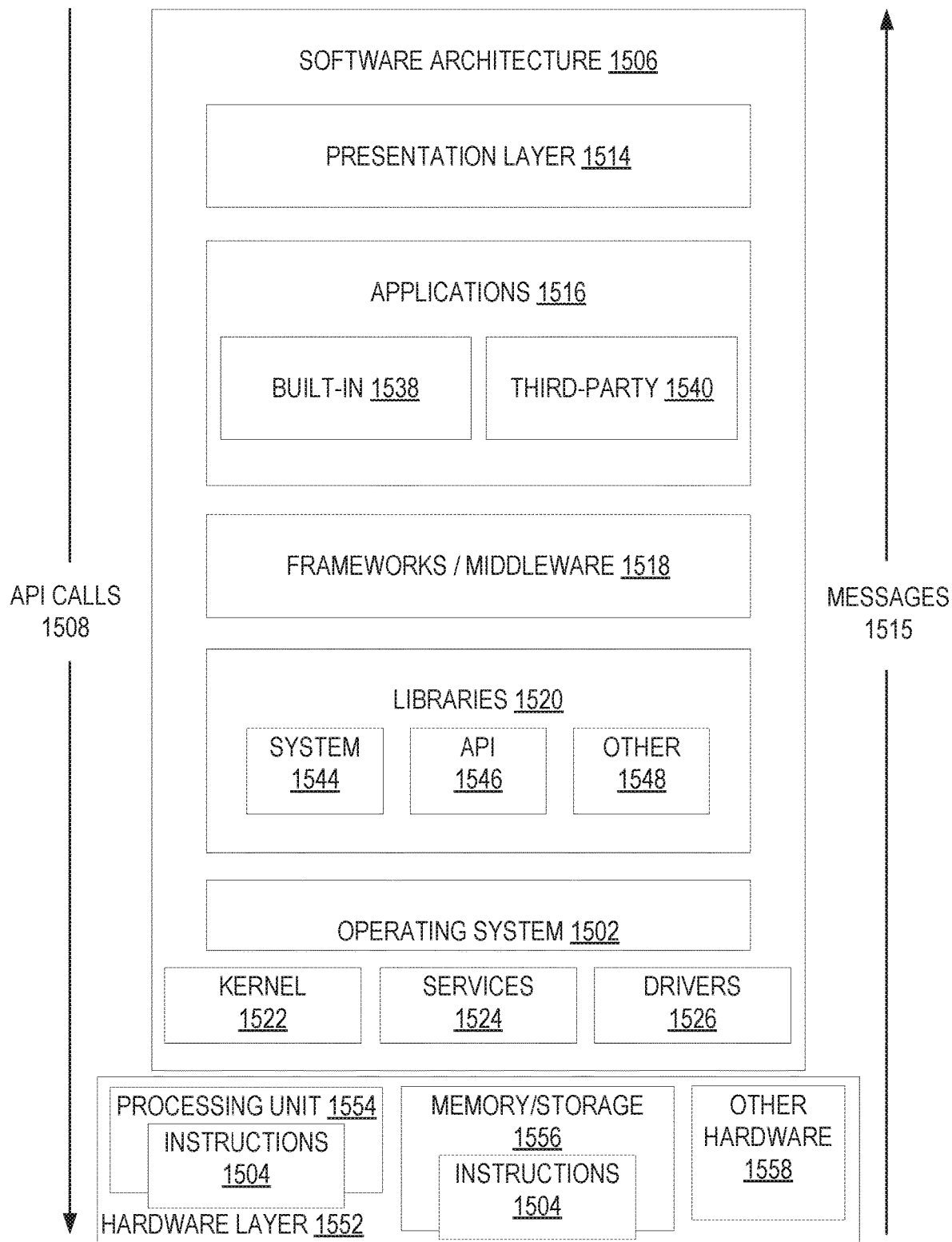
FIG. 15 is a block diagram illustrating a representative software architecture, which may be used in conjunction with various hardware architectures herein described, according to example embodiments.

FIG. 15 is a block diagram illustrating an example software architecture 1506, which may be used in conjunction with various hardware architectures herein described. FIG. 15 is a non-limiting example of a software architecture and it will be appreciated that many other architectures may be implemented to facilitate the functionality described herein. The software architecture 1506 may execute on hardware such as machine 1600 of FIG. 16 that includes, among other things, processors 1604, memory 1614, and input/output (I/O) components 1618. A representative hardware layer 1552 is illustrated and can represent, for example, the machine 1600 of FIG. 16. The representative hardware layer 1552 includes a processing unit 1554 having associated executable instructions 1504. Executable instructions 1504 represent the executable instructions of the software architecture 1506, including implementation of the methods, components and so forth described herein. The hardware layer 1552 also includes memory and/or storage modules memory/storage 1556, which also have executable instructions 1504. The hardware layer 1552 may also comprise other hardware 1558.

In the example architecture of FIG. 15, the software architecture 1506 may be conceptualized as a stack of layers where each layer provides particular functionality. For example, the software architecture 1506 may include layers such as an operating system 1502, libraries 1520, applications 1516, frameworks/middleware 1518, and a presentation layer 1514. Operationally, the applications 1516 and/or other components within the layers may invoke API calls 1508 through the software stack and receive a response 1512 as in response to the API calls 1508. The layers illustrated are representative in nature and not all software architectures have all layers. For example, some mobile or special purpose operating systems may not provide a frameworks/middleware 1518, while others may provide such a layer. Other software architectures may include additional or different layers.

The operating system 1502 may manage hardware resources and provide common services. The operating system 1502 may include, for example, a kernel 1522 services 1524, and drivers 1526. The kernel 1522 may act as an abstraction layer between the hardware and the other software layers. For example, the kernel 1522 may be responsible for memory management, processor management (e.g., scheduling), component management, networking, security settings, and so on. The services 1524 may provide other common services for the other software layers. The drivers 1526 are responsible for controlling or interfacing with the underlying hardware. For instance, the drivers 1526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1520 provide a common infrastructure that is used by the applications 1516 and/or other components and/or layers. The libraries 1520 provide functionality that allows other software components to perform tasks in an easier fashion than to interface directly with the underlying operating system 1502 functionality (e.g., kernel 1522, services 1524 and/or drivers 1526). The libraries 1520 may include system libraries 1544 (e.g., C standard library) that may provide functions such as memory allocation functions, string manipulation functions, mathematical functions, and the like. In addition, the libraries 1520 may include API libraries 1546 such as media libraries (e.g., libraries to support presentation and manipulation of various media format such as MPREG4, H.264, MP3, AAC, AMR, JPG, PNG), graphics libraries (e.g., an OpenGt framework that may be used to render two-dimensional and 3D in a graphic content on a display), database libraries (e.g., SQLite that may provide various relational database functions), web libraries (e.g., WebKit that may provide web browsing functionality), and the like. The libraries 1520 may also include a wide variety of other libraries 1548 to provide many other APIs to the applications 1516 and other software components/modules.

The frameworks/middleware 1518 (also sometimes referred to as middleware) provide a higher-level common infrastructure that may be used by the applications 1516 and/or other software components/modules. For example, the frameworks/middleware 1518 may provide various graphic user interface (GUI) functions, high-level resource management, high-level location services, and so forth. The frameworks/middleware 1518 may provide a broad spectrum of other APIs that may be utilized by the applications 1516 and/or other software components/modules, some of which may be specific to a particular operating system 1502 or platform.

The applications 1516 include built-in applications 1538 and/or third-party applications 1540. Examples of representative built-in applications 1538 may include, but are not limited to, a contacts application, a browser application, a book reader application, a location application, a media application, a messaging application, and/or a game application. Third-party applications 1540 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1540 may invoke the API calls 1508 provided by the mobile operating system (such as operating system 1502) to facilitate functionality described herein.

The applications 1516 may use built in operating system functions (e.g., kernel 1522, services 1524, and/or drivers 1526), libraries 1520, and frameworks/middleware 1518 to create user interfaces to interact with users of the system. Alternatively, or additionally, in some systems interactions with a user may occur through a presentation layer, such as presentation layer 1514. In these systems, the application/component "logic" can be separated from the aspects of the application/component that interact with a user.

Figure 16:
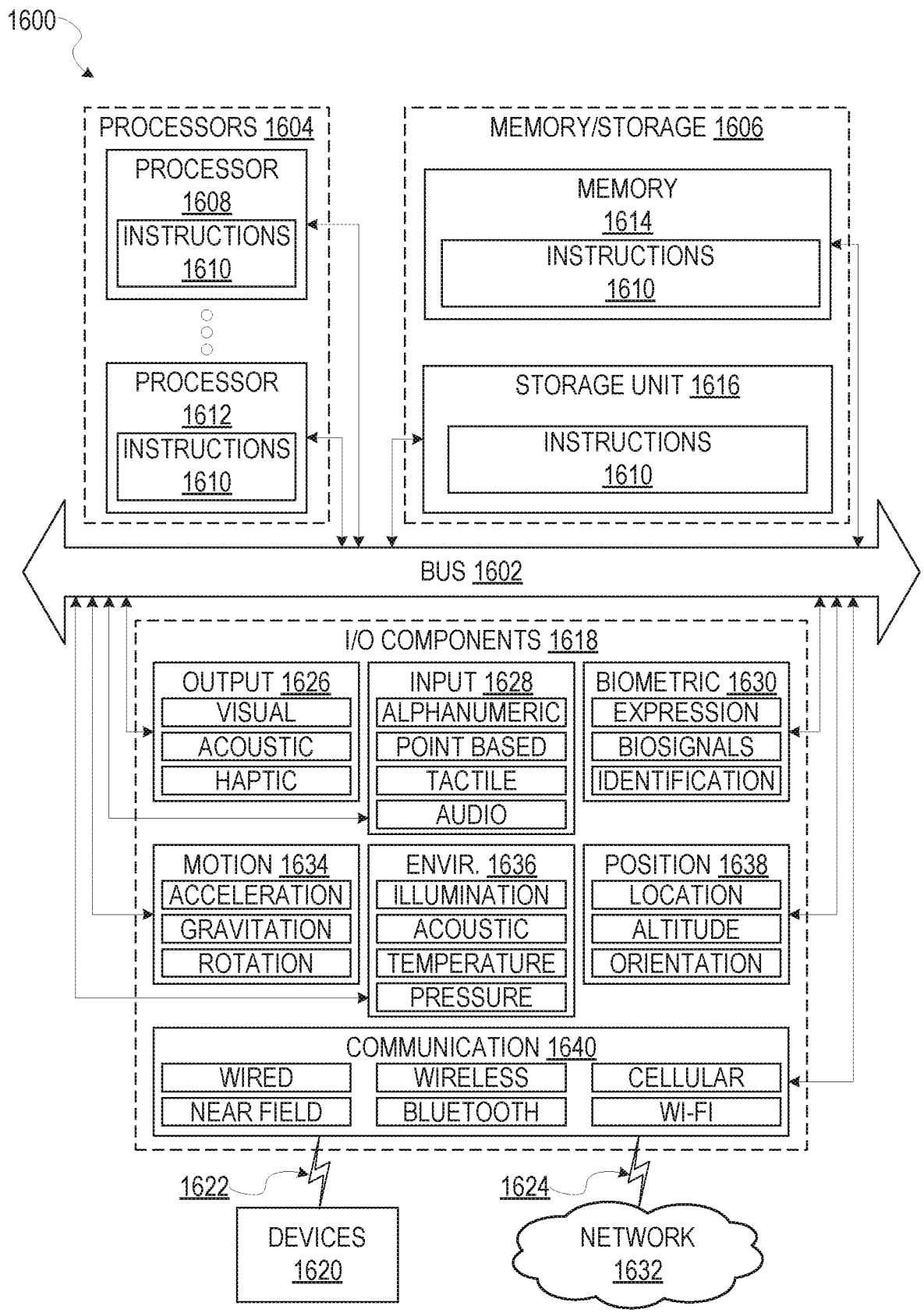
FIG. 16 is a block diagram illustrating components of a machine able to read instructions from a machine-readable medium (e.g., a machine-readable storage medium) and perform any one or more of the methodologies discussed herein, according to example embodiments.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1610 (e.g., software, a program, an application, an applet, an app, or other executable code) for causing the machine 1600 to perform any one or more of the methodologies discussed herein may be executed. As such, the instructions 1610 may be used to implement modules or components described herein. The instructions 1610 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1610, sequentially or otherwise, that specify actions to be taken by machine 1600. Further, while only a single machine 1600 is illustrated, the term "machine" shall also be taken to include a collection of machines that individually or jointly execute the instructions 1610 to perform any one or more of the methodologies discussed herein.

The machine 1600 may include processors 1604, memory memory/storage 1606, and I/O components 1618, which may be configured to communicate with each other such as via a bus 1602. In an example embodiment, the processors 1604 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1608 and a processor 1612 that may execute the instructions 1610. The term "processor" is intended to include multi-core processors 1604 that may comprise two or more independent processors (sometimes referred to as "cores") that may execute instructions contemporaneously. Although FIG. 16 shows multiple processors, the machine 1600 may include a single processor with a single core, a single processor with multiple cores e.g., a multi-core processor), multiple processors with a single core, multiple processors with multiple cores, or any combination thereof.

The memory/storage 1606 may include a memory 1614, such as a main memory, or other memory storage, and a storage unit 1616, both accessible to the processors 1604 such as via the bus 1602. The storage unit 1616 and memory 1614 store the instructions 1610 embodying any one or more of the methodologies or functions described herein. The instructions 1610 may also reside, completely or partially, within the memory 1614, within the storage unit 1616, within at least one of the processors 1604 (e.g., within the processor's cache memory), or any suitable combination thereof, during execution thereof by the machine 1600. Accordingly, the memory 1614, the storage unit 1616, and the memory of processors 1604 are examples of machine-readable media.

The I/O components 1618 may include a wide variety of components to receive input, provide output, produce output, transmit information, exchange information, capture measurements, and so on. The specific I/O components 1618 that are included in a particular machine 1600 will depend on the type of machine. For example, portable machines such as mobile phones will likely include a touch input device or other such input mechanisms, while a headless server machine will likely not include such a touch input device. It will be appreciated that the I/O components 1618 may include many other components that are not shown in FIG. 16. The I/O components 1618 are grouped according to functionality merely for simplifying the following discussion and the grouping is in no way limiting. In various example embodiments, the I/O components 1618 may include output components 1626 and input components 1628. The output components 1626 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1628 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1618 may include biometric components 1630, motion components 1634, environmental components 1636, or position components 1638 among a wide array of other components. For example, the biometric components 1630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1634 may include acceleration sensor components (e.g., accelerometer), gravitation sensor components, rotation sensor components (e.g., gyroscope), and so forth. The environment components 1636 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1638 may include location sensor components (e.g., a UPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1618 may include communication components 1640 operable to couple the machine 1600 to a network 1632 or devices 1620 via coupling 1624 and coupling 1622, respectively. For example, the communication components 1640 may include a network interface component or other suitable device to interface with the network 1632. In further examples, communication components 1640 may include wired communication components, wireless communication components, cellular communication components. Near Field Communication (NFC) components, Bluetooth® components (e.g., Bluetooth® Low Energy), Wi-Fi® components, and other communication components to provide communication via other modalities. The devices 1620 may be another machine or any of a wide variety of peripheral devices (e.g., a peripheral device coupled via a USB).

Moreover, the communication components 1640 may detect identifiers or include components operable to detect identifiers. For example, the communication components 1640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1640, such as, location via Internet Protocol (IP) geo-location, location via Wi-Fi® signal triangulation, location via detecting a NFC beacon signal that may indicate a particular location, and so forth.

Glossary:

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a CPU, a RISC processor, a CISC processor, a GPU, a DSP, an ASIC, a RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A system, comprising:
    a memory; and
    at least one hardware processor coupled to the memory and comprising a virtual rendering system comprising a set of tracking subsystems, the virtual rendering system causing the system to perform operations comprising:
    detecting a triggering event for rendering a virtual modification to a real-world surface at a specific geographic location, the detecting of the triggering event comprising:
    detecting, based on a weather data, a weather condition; and detecting, based on geolocation data from a computing device, the computing device being within a predefined distance of the specific geographic location;
    in response to detecting the triggering event, identifying the real-world surface in a three-dimensional (3D) space captured within a camera feed produced by a camera of the computing device and selecting a visual effect to apply to the real-world surface based on an association of the visual effect with the specific geographic location and the weather condition; and
    applying the visual effect to the real-world surface in the 3D space captured within the camera feed, the applying of the visual effect to the real-world surface causing a modified surface to be rendered in a presentation of the camera feed on a display of the computing device, the applying the visual effect to the real-world surface comprising:
        tracking, via a first tracking subsystem from the set of tracking subsystems, the visual effect at the real-world surface using tracking indicia; and
        in response to detecting an interruption of the tracking indicia, switching from tracking the visual effect via the first tracking subsystem to tracking the visual effect via a second tracking subsystem from among the set of tracking subsystems.

2. The system of claim 1, wherein the applying of the visual effect to the real-world surface comprises determining boundaries of the real-world surface in the 3D space captured within the camera feed.

3. The system of claim 2, wherein the camera feed comprises multiple images; and wherein the applying of the visual effect further comprises:
    classifying pixels of the multiple images that are inside the boundaries of the real-world surface according to a first class; and
    classifying pixels of the multiple images that are outside the boundaries of the real-world surface according to a second class.

4. The system of claim 3, wherein the multiple images present multiple views of the real-world surface.

5. The system of claim 2, wherein the determining of the boundaries of the real-world surface comprises:
    obtaining a set of points from the 3D space captured within the camera feed;
    associating a first subset of the set of points with a first plane in the 3D space; and
    associating a second subset of the set of points with at least a second plane in the 3D space;
    determining the first plane corresponds to the real-world surface based on sensor data from one or more sensors of the computing device; and
    identifying the boundaries of the first plane based on the first subset of the set of points.

6. The system of claim 2, wherein the determining of the boundaries of the real-world surface comprises:
    identifying regions of similar color within the 3D space captured within the camera feed;
    determining a first region of similar color within the 3D space corresponds to the real-world surface; and
    identifying boundaries of the first region of similar color.

7. The system of claim 2, wherein the camera feed comprises multiple images; and
    wherein the applying of the visual effect comprises applying an image segmentation neural network to the multiple images, the applying of the image segmentation neural network to the multiple images yielding multiple segmented images, each of the multiple segmented images having multiple image segments, the multiple image segments comprising:
        a first image segment corresponding to the real-world surface; and
        a second image segment corresponding to a remainder of the 3D space captured within the camera feed.

8. The system of claim 1, wherein the detecting of the real-world surface is based on user input identifying the real-world surface.

9. The system of claim 1, wherein the detecting of the triggering event further comprises detecting a particular date or time.

10. The system of claim 9, wherein applying the visual effect to the real-world surface comprises one or more of, changing a texture of the real-world surface, blurring the real-world surface, rendering a moving virtual object within boundaries of the real-world surface, and replacing the real-world surface with visual content.

11. The system of claim 1, wherein applying the visual effect to the real-world surface comprises applying an animation effect to the real-world surface.

12. The system of claim 11, wherein the association with the specific geographic location is based on a user input.

13. The system of claim 1, wherein the operations further comprise selecting the visual effect based on user input.

14. A method comprising:
    detecting a triggering event for rendering a virtual modification to a real-world surface at a specific geographic location, the detecting of the triggering event comprising:
    detecting, based on a weather data, a weather condition; and
    detecting, based on geolocation data from a computing device, the computing device being within a predefined distance of the specific geographic location;
    in response to detecting the triggering event, identifying the real-world surface in a three-dimensional (3D) space captured within a camera feed produced by a camera of a computing device and selecting a visual effect to apply to the real-world surface based an association of the visual effect with the specific geographic location and the weather condition; and applying the visual effect to the real-world surface in the 3D space captured within the camera feed, the applying of the visual effect to the real-world surface causing a modified surface to be rendered in presenting the camera feed on a display of the computing device, the applying the visual effect to the real-world surface comprising:

tracking, via a first tracking subsystem from a set of tracking subsystems, the visual effect at the real-world surface using tracking indicia; and in response to detecting an interruption of the tracking indicia, switching from tracking the visual effect via the first tracking subsystem to tracking the visual effect via a second tracking subsystem from among the set of tracking subsystems.

15. The method of claim 14, wherein the applying of the visual effect to the real-world surface comprises determining boundaries of the real-world surface in the 3D space captured within the camera feed.

16. The method of claim 15, wherein the camera feed comprises multiple images; and wherein the applying of the visual effect further comprises:

classifying pixels of the multiple images that are inside the boundaries of the real-world surface according to a first class; and classifying pixels of the multiple images that are outside the boundaries of the real-world surface according to a second class.

17. The method of claim 15, wherein the determining of the boundaries of the real-world surface comprises:

obtaining a set of points from the 3D space captured within the camera feed;

associating a first subset of the set of points with a first plane in the 3D space; and associating a second subset of the set of points with at least a second plane in the 3D space;

determining the first plane corresponds to the real-world surface based on sensor data from one or more sensors of the computing device; and identifying the boundaries of the first plane based on the first subset of the set of points.

18. The method of claim 15, further comprising:

selecting the visual effect from among a plurality of visual effects based on an association of the visual effect with the triggering event.

19. The method of claim 15, wherein the camera feed comprises multiple images, wherein the multiple images present multiple views of the real-world surface.

20. A non-transitory machine-readable storage medium including a virtual rendering system that includes instructions that, when executed by one or more processors of a machine, cause the machine to perform operations comprising:

detecting a triggering event for rendering a virtual modification to a real-world surface at a specific geographic location, the detecting of the triggering event comprising:

detecting, based on a weather data, a weather condition; and detecting, based on geolocation data from a computing device, the computing device being within a predefined distance of the specific geographic location;

in response to detecting the triggering event, identifying the real-world surface in a 3D space captured within a camera feed produced by a camera of a computing device and selecting a visual effect to apply to the real-world surface an association of the visual effect with the specific geographic location and the weather condition; and applying the visual effect to the real-world surface in the 3D space captured within the camera feed, the applying of the visual effect to the real-world surface causing a modified surface to be rendered in presenting the camera feed on a display of the computing device, the applying the visual effect to the real-world surface comprising:

tracking, via a first tracking subsystem from a set of tracking subsystems, the visual effect at the real-world surface using tracking indicia; and in response to detecting an interruption of the tracking indicia, switching from tracking the visual effect via the first tracking subsystem to tracking the visual effect via a second tracking subsystem from among the set of tracking subsystems.

\* \* \* \* \*